United States Patent
Wood et al.

(10) Patent No.: US 10,038,633 B2
(45) Date of Patent: Jul. 31, 2018

(54) PROTOCOL TO QUERY FOR HISTORICAL NETWORK INFORMATION IN A CONTENT CENTRIC NETWORK

(71) Applicant: CISCO TECHNOLOGY, INC., San Jose, CA (US)

(72) Inventors: Christopher A. Wood, San Francisco, CA (US); Ignacio Solis, Scotts Valley, CA (US); Andriana Ioannou, Thessaloniki (GR); Glenn C. Scott, Portola Valley, CA (US)

(73) Assignee: Cisco Technology, Inc., San Jose, CA (US)

( * ) Notice: Subject to any disclaimer, the term of this patent is extended or adjusted under 35 U.S.C. 154(b) by 240 days.

(21) Appl. No.: 15/061,979

(22) Filed: Mar. 4, 2016

(65) Prior Publication Data

US 2017/0257314 A1    Sep. 7, 2017

(51) Int. Cl.
*H04L 12/741* (2013.01)
*H04L 12/803* (2013.01)
(Continued)

(52) U.S. Cl.
CPC ............ *H04L 45/74* (2013.01); *G06F 15/167* (2013.01); *H04L 45/50* (2013.01); *H04L 47/125* (2013.01);
(Continued)

(58) Field of Classification Search
CPC ............ H04L 12/185; H04L 43/0876; H04L 45/7457–45/748;
(Continued)

(56) References Cited

U.S. PATENT DOCUMENTS

| 817,441 A | 4/1906 | Niesz |
| 4,309,569 A | 1/1982 | Merkle |

(Continued)

FOREIGN PATENT DOCUMENTS

| EP | 2120402 | 11/2009 |
| EP | 2120419 | 11/2009 |

(Continued)

OTHER PUBLICATIONS

Jacobson, Van et al., "Content-Centric Networking, Whitepaper Describing Future Assurable Global Networks", Palo Alto Research Center, Inc., Jan. 30, 2007, pp. 1-9.
(Continued)

*Primary Examiner* — Wing F Chan
*Assistant Examiner* — Raji Krishnan

(57) ABSTRACT

One embodiment provides a system that facilitates querying of historical network information. During operation, the system generates a query for historical information associated with interest and content object packets, wherein a name for an interest is a hierarchically structured variable length identifier that includes contiguous name components ordered from a most general level to a most specific level, wherein the query is based on a name prefix that includes one or more contiguous name components. The system transmits the query to a responding entity. In response to receiving the historical information from the responding entity, the system performs an operation that increases network efficiency based on the historical information, thereby facilitating a protocol for querying the historical information to increase network efficiency.

18 Claims, 14 Drawing Sheets

(51) Int. Cl.

| | |
|---|---|
| *H04L 12/807* | (2013.01) |
| *H04L 12/841* | (2013.01) |
| *H04L 29/12* | (2006.01) |
| *H04L 29/06* | (2006.01) |
| *H04L 29/08* | (2006.01) |
| *G06F 15/167* | (2006.01) |
| *H04L 12/723* | (2013.01) |
| *H04L 12/801* | (2013.01) |

(52) U.S. Cl.
CPC ............ *H04L 47/193* (2013.01); *H04L 47/27* (2013.01); *H04L 47/283* (2013.01); *H04L 61/6009* (2013.01); *H04L 63/0823* (2013.01); *H04L 67/1097* (2013.01); *H04L 67/2842* (2013.01); *H04L 69/02* (2013.01); *H04L 69/16* (2013.01)

(58) Field of Classification Search
CPC .. H04L 63/062–63/0876; H04L 67/327; G06F 15/167–15/173; G06F 17/30312–17/30861
See application file for complete search history.

(56) References Cited

U.S. PATENT DOCUMENTS

| | | |
|---|---|---|
| 4,921,898 A | 5/1990 | Lenney |
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,052,683 A | 4/2000 | Irwin |
| 6,085,320 A | 7/2000 | Kaliski, Jr. |
| 6,091,724 A | 7/2000 | Chandra |
| 6,173,364 B1 | 1/2001 | Zenchelsky |
| 6,226,618 B1 | 5/2001 | Downs |
| 6,233,617 B1 | 5/2001 | Rothwein |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,152,094 B1 | 12/2006 | Jannu |
| 7,177,646 B2 | 2/2007 | ONeill |
| 7,206,860 B2 | 4/2007 | Murakami |
| 7,206,861 B1 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,071,498 B2 | 6/2015 | Beser |
| 9,112,895 B1 | 8/2015 | Lin |
| 2002/0010795 A1 | 1/2002 | Brown |
| 2002/0038296 A1 | 3/2002 | Margolus |

(56) References Cited

U.S. PATENT DOCUMENTS

| | | |
|---|---|---|
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0033394 A1 | 2/2003 | Stine |
| 2003/0046396 A1 | 3/2003 | Richter |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0078868 A1* | 4/2007 | Faulkner ............ H04L 41/0213 |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |

(56) References Cited

U.S. PATENT DOCUMENTS

| | | |
|---|---|---|
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1* | 8/2010 | Jacobson ............ H04L 45/7457 370/392 |
| 2010/0195655 A1* | 8/2010 | Jacobson ................ H04L 45/00 370/392 |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1* | 4/2011 | Jacobson .............. H04L 45/745 370/392 |
| 2011/0106755 A1 | 5/2011 | Hao |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219427 A1 | 9/2011 | Hito |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0066823 A1 | 3/2013 | Sweeney |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0132719 A1 | 5/2013 | Kobayashi |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |

(56) References Cited

U.S. PATENT DOCUMENTS

| | | |
|---|---|---|
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0040628 A1 | 2/2014 | Fort |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0108313 A1 | 4/2014 | Heidasch |
| 2014/0108474 A1 | 4/2014 | David |
| 2014/0112325 A1* | 4/2014 | Calcev ............... H04W 48/16 370/338 |
| 2014/0115037 A1 | 4/2014 | Liu |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0214942 A1 | 7/2014 | Ozonat |
| 2014/0233575 A1 | 8/2014 | Xie |
| 2014/0237085 A1 | 8/2014 | Park |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0248455 A1* | 9/2015 | Sevilla ............... G06F 17/30312 707/736 |
| 2016/0183168 A1* | 6/2016 | Horn ............... H04W 48/14 709/225 |
| 2017/0257444 A1* | 9/2017 | Wood ............... H04L 43/0876 |
| 2017/0366526 A1* | 12/2017 | Wood ............... H04L 63/0876 |

FOREIGN PATENT DOCUMENTS

| | | |
|---|---|---|
| EP | 2124415 A2 | 11/2009 |
| EP | 2214357 A1 | 8/2010 |
| EP | 2978174 A1 | 1/2016 |
| WO | 03049369 A2 | 6/2003 |
| WO | 2007144388 A1 | 12/2007 |
| WO | 2013123410 | 8/2013 |

OTHER PUBLICATIONS

Koponen, Teemu et al., "A Data-Oriented (and Beyond) Network Architecture", SIGCOMM '07, Aug. 27-31, 2007, Kyoto, Japan, XP-002579021, p. 181-192.

Mahadevan, Priya, et al. "Orbis: rescaling degree correlations to generate annotated internet topologies." ACM SIGCOMM Computer Communication Review. vol. 37. No. 4. ACM, 2007.

Mahadevan, Priya, et al. "Systematic topology analysis and generation using degree correlations." ACM SIGCOMM Computer Communication Review. vol. 36. No. 4. ACM, 2006.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network and Computer Applications 35 (2012) 221-229.

Detti et al., "Supporting the Web with an information centric network that routes by name", Aug. 2012, Computer Networks 56, pp. 3705-3702.

Garcia-Luna-Aceves et al., "Automatic Routing Using Multiple Prefix Labels", 2012, IEEE, Ad Hoc and Sensor Networking Symposium.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

L. Wang et al., 'OSPFN: An OSPF Based Routing Protocol for Named Data Networking,' Technical Report NDN-0003, 2012.

Merindol et al., "An efficient algorithm to enable path diversity in link state routing networks", Jan. 10, Computer Networks 55 (2011), pp. 1132-1140.

Soh et al., "Efficient Prefix Updates for IP Router Using Lexicographic Ordering and Updateable Address Set", Jan. 2008, IEEE Transactions on Computers, vol. 57, No. 1.

V. Jacobson et al., 'Networking Named Content,' Proc. IEEE CoNEXT '09, Dec. 2009.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

"PBC Library-Pairing-Based Cryptography-About," http://crypto.stanford.edu/pbc. downloaded Apr. 27, 2015.

C. Gentry and A. Silverberg. Hierarchical ID-Based Cryptography. Advances in Cryptology—ASIACRYPT 2002. Springer Berlin Heidelberg (2002).

Boneh et al., "Collusion Resistant Broadcast Encryption With Short Ciphertexts and Private Keys", 2005.

Hoque et al., "NLSR: Named-data Link State Routing Protocol", Aug. 12, 2013, ICN'13.

D. Boneh and M. Franklin. Identity-Based Encryption from the Weil Pairing. Advances in Cryptology—CRYPTO 2001, vol. 2139, Springer Berlin Heidelberg (2001).

Xiong et al., "CloudSeal: End-to-End Content Protection in Cloud-based Storage and Delivery Services", 2012.

J. Bethencourt, A, Sahai, and B. Waters, 'Ciphertext-policy attribute-based encryption,' in Proc. IEEE Security & Privacy 2007, Berkeley, CA, USA, May 2007, pp. 321-334.

J. Lotspiech, S. Nusser, and F. Pestoni. Anonymous Trust: Digit.

J. Shao and Z. Cao. CCA-Secure Proxy Re-Encryption without Pairings. Public Key Cryptography. Springer Lecture Notes in Computer ScienceVolume 5443 (2009).

Gopal et al. "Integrating content-based Mechanisms with hierarchical File systems", Feb. 1999, University of Arizona, 15 pages.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

RTMP (2009). Available online at http://wwwimages.adobe.com/www.adobe.com/content/dam/Adobe/en/devnet/rtmp/ pdf/rtmp specification 1.0.pdf.

(56) References Cited

OTHER PUBLICATIONS

S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Kamara and K. Lauter. Cryptographic Cloud Storage. Financial Cryptography and Data Security. Springer Berlin Heidelberg (2010).
Sandvine, Global Internet Phenomena Report—Spring 2012. Located online at http://www.sandvine.com/downloads/ documents/Phenomenal H 2012/Sandvine Global Internet Phenomena Report 1H 2012.pdf.
The Despotify Project (2012). Available online at http://despotify.sourceforge.net/.
V. K. Adhikari, S. Jain, Y. Chen, and Z.-L. Zhang. Vivisecting Youtube:An Active Measurement Study. In INFOCOM12 Mini-conference (2012).
Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network &oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (PURSUIT)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
Afanasyev, Alexander, et al. "Interest flooding attack and countermeasures in Named Data Networking." IFIP Networking Conference, 2013. IEEE, 2013.
B. Ahlgren et al., 'A Survey of Information-centric Networking' IEEE Commun. Magazine, Jul. 2012, pp. 26-36.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.

(56) References Cited

OTHER PUBLICATIONS

Ghodsi, Ali, et al. "Information-centric networking: seeing the forest for the trees." Proceedings of the 10th ACM Workshop on Hot Topics in Networks. ACM, 2011.

Ghodsi, Ali, et al. "Naming in content-oriented architectures." Proceedings of the ACM SIGCOMM workshop on Information-centric networking. ACM, 2011.

Gupta, Anjali, Barbara Liskov, and Rodrigo Rodrigues. "Efficient Routing for Peer-to-Peer Overlays." NSDI. vol. 4. 2004.

Heckerman, David, John S. Breese, and Koos Rommelse. "Decision-Theoretic Troubleshooting." Communications of the ACM. 1995.

Heinemeier, Kristin, et al. "Uncertainties in Achieving Energy Savings from HVAC Maintenance Measures in the Field." ASHRAE Transactions 118.Part 2 {2012}.

Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).

https://code.google.com/p/ccnx-trace/.

I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.

Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.

J. Aumasson and D. Bernstein, "SipHash: a fast short-input PRF", Sep. 18, 2012.

J. Hur, "Improving security and efficiency in attribute-based data sharing," IEEE Trans. Knowledge Data Eng., vol. 25, No. 10, pp. 2271-2282, Oct. 2013.

Jacobson et al., "Custodian-Based Information Sharing," Jul. 2012, IEEE Communications Magazine: vol. 50 Issue 7 (p. 3843).

Ji, Kun, et al. "Prognostics enabled resilient control for model-based building automation systems." Proceedings of the 12th Conference of International Building Performance Simulation Association. 2011.

K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.

Katipamula, Srinivas, and Michael R. Brambley. "Review article: methods for fault detection, diagnostics, and prognostics for building systemsa review, Part I." HVAC&R Research 11.1 (2005): 3-25.

Katipamula, Srinivas, and Michael R. Brambley. "Review article: methods for fault detection, diagnostics, and prognostics for building systemsa review, Part II." HVAC&R Research 11.2 (2005): 169-187.

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.

Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.

Lopez, Javier, et al. "Trust management systems for wireless sensor networks: Best practices." Computer Communications 33.9 (2010): 1086-1093.

M. Green and G. Ateniese, "Identity-based proxy re-encryption," in Proc. ACNS 2007, Zhuhai, China, Jun. 2007, pp. 288-306.

M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.

M. Naor and B. Pinkas "Efficient trace and revoke schemes," in Proc. FC 2000, Anguilla, British West Indies, Feb. 2000, pp. 1-20.

M. Nystrom, S. Parkinson, A. Rusch, and M. Scott, "PKCS#12: Personal information exchange syntax v. 1.1," IETF RFC 7292, K. Moriarty, Ed., Jul. 2014.

M. Parsa and J.J. Garcia-Luna-Aceves, "A Protocol for Scalable Loop-free Multicast Routing." IEEE JSAC, Apr. 1997.

M. Walfish, H. Balakrishnan, and S. Shenker, "Untangling the web from DNS," in Proc. USENIX NSDI 2004, Oct. 2010, pp. 735-737.

Matocha, Jeff, and Tracy Camp. 'A taxonomy of distributed termination detection algorithms.' Journal of Systems and Software 43.3 (1998): 207-221.

Matteo Varvello et al., "Caesar: A Content Router for High Speed Forwarding", ICN 2012, Second Edition on Information-Centric Networking, New York, Aug. 2012.

Mobility First Project [online], http://mobilityfirst.winlab.rutgers.edu/, Downloaded Mar. 9, 2015.

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

S. Deering, "Multicast Routing in Internetworks and Extended LANs," Proc. ACM SIGCOMM '88, Aug. 1988.

S. Deering et al., "The PIM architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

(56) References Cited

OTHER PUBLICATIONS

T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.
Vutukury, Srinivas, and J. J. Garcia-Luna-Aceves. A simple approximation to minimum-delay routing. vol. 29. No. 4. ACM, 1999.
W.-G. Tzeng and Z.-J. Tzeng, "A public-key traitor tracing scheme with revocation using dynamic shares," in Proc. PKC 2001, Cheju Island, Korea, Feb. 2001, pp. 207-224.
Waldvogel, Marcel "Fast Longest Prefix Matching: Algorithms, Analysis, and Applications", A dissertation submitted to the Swiss Federal Institute of Technology Zurich, 2002.
Wang, Jiangzhe et al.,"DMND: Collecting Data from Mobiles Using Named Data", Vehicular Networking Conference, 2010 IEEE, pp. 49-56.
Xylomenos, George, et al. "A survey of information-centric networking research." Communications Surveys & Tutorials, IEEE 16.2 (2014): 1024-1049.
Yi, Cheng, et al. 'A case for stateful forwarding plane.' Computer Communications 36.7 (2013): 779-791.
Yi, Cheng, et al. 'Adaptive forwarding in named data networking.' ACM SIGCOMM computer communication review 42.3 (2012): 62-67.
Zahariadis, Theodore, et al. "Trust management in wireless sensor networks." European Transactions on Telecommunications 21.4 (2010): 386-395.
Zhang, et al., "Named Data Networking (NDN) Project", http://www.parc.com/publication/2709/named-data-networking-ndn-project.html, Oct. 2010, NDN-0001, PARC Tech Report.
Zhang, Lixia, et al. 'Named data networking.' ACM SIGCOMM Computer Communication Review 44.3 {2014): 66-73.
D. Trossen and G. Parisis, "Designing and realizing and information-centric internet," IEEE Communications Magazing, vol. 50, No. 7, pp. 60-67, Jul. 2012.
Gasti, Paolo et al., 'DoS & DDoS in Named Data Networking', 2013 22nd International Conference on Computer Communications and Networks (ICCCN), Aug. 2013, pp. 1-7.
J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.
Kaya et al., "A Low Power Lookup Technique for Multi-Hashing Network Applications", 2006 IEEE Computer Society Annual Symposium on Emerging VLSI Technologies and Architectures, Mar. 2006.
Hoque et al., 'NLSR: Named-data Link State Routing Protocol', Aug. 12, 2013, ICN 2013, pp. 15-20.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Amadeo et al. "Design and Analysis of a Transport-Level Solution for Content-Centric VANETs", University "Mediterranea" of Reggio Calabria, Jun. 15, 2013.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
International Search Report and Written Opinion in counterpart International Application No. PCT/US2017/020798, dated Jun. 13, 2017, 10 pages.
Carofiglio, et al., "Optimal multipath congestion control and request forwarding in Information-Centric Networks," 2013 21st IEEE International Conference on Network Protocols (ICNP), Oct. 2013, 10 pages.

* cited by examiner

PROTOCOL TO QUERY FOR HISTORICAL NETWORK INFORMATION IN A CONTENT CENTRIC NETWORK

RELATED APPLICATIONS

The subject matter of this application is related to the subject matter in the following applications:

U.S. patent application Ser. No. 13/847,814, entitled "ORDERED-ELEMENT NAMING FOR NAME-BASED PACKET FORWARDING," by inventor Ignacio Solis, filed 20 Mar. 2013 (hereinafter "U.S. patent application Ser. No. 13/847,814");

U.S. patent application Ser. No. 12/338,175, entitled "CONTROLLING THE SPREAD OF INTERESTS AND CONTENT IN A CONTENT CENTRIC NETWORK," by inventors Van L. Jacobson and Diana K. Smetters, filed 18 Dec. 2008 (hereinafter "U.S. patent application Ser. No. 12/338,175");

U.S. patent application Ser. No. 14/334,530, entitled "INTEREST RETURN CONTROL MESSAGE," by inventors Marc E. Mosko, Ignacio Solis, and Ersin Uzun, filed 17 Jul. 2014 (hereinafter "U.S. patent application Ser. No. 14/334,530"); and U.S. patent application Ser. No. 14/746,490, entitled "TRANSPORT STACK NAME SCHEME AND IDENTITY MANAGEMENT," by inventors Christopher A. Wood and Glenn C. Scott, filed 22 Jun. 2015 (hereinafter "U.S. patent application Ser. No. 14/746,490");

the disclosures of which are herein incorporated by reference in their entirety.

BACKGROUND

Field

This disclosure is generally related to distribution of digital content. More specifically, this disclosure is related to a system for querying historical network information in a content centric network, which facilitates users of the system to increase network efficiency.

Related Art

The proliferation of the Internet and e-commerce continues to create a vast amount of digital content. Content centric network (CCN) architectures have been designed to facilitate accessing and processing such digital content. A CCN includes entities, or nodes, such as network clients, forwarders (e.g., routers), and content producers, which communicate with each other by sending interest packets for various content items and receiving content object packets in return. CCN interests and content objects are identified by their unique names, which are typically hierarchically structured variable length identifiers (HSVLI). An HSVLI can include contiguous name components ordered from a most general level to a most specific level. A CCN name prefix, or namespace, may include one or more contiguous name components beginning from the most general level.

Some transport protocols implement flow and congestion control by maintaining a window of messages (e.g., packets) sent from a client (e.g, a consumer) to a server (e.g., a content producer). Upon sending a packet, the consumer adds a packet to the window, and upon receiving a responsive packet, the consumer removes a packet from the window. For a window with a size of "w," only w messages can be outstanding at any given time. Some transport protocols (such as TCP) use a sliding window such that w is a variable that changes dynamically based on network conditions. For example, if the protocol determines congestion, e.g., due to heavy traffic of neighboring nodes, the consumer can decrease w so that fewer messages are sent to the network. Similarly, if the protocol determines that the network is not congested, the consumer can increase w so that more messages can be sent for better throughput and latency performance.

While a CCN brings many desired features to a network, some issues remain unsolved with enabling a CCN transport protocol to increase network efficiency by allowing system users to query the network for historical network information.

SUMMARY

One embodiment provides a system that facilitates querying of historical network information. During operation, the system generates a query for historical information associated with interest and corresponding content object packets, wherein a name for an interest packet is a hierarchically structured variable length identifier ("HSVLI") that includes contiguous name components ordered from a most general level to a most specific level, wherein the query is based on a name prefix that includes one or more contiguous name components. The system transmits the query to a responding entity. In response to receiving the historical information from the responding entity, the system performs an operation that increases network efficiency based on the historical information, thereby facilitating a protocol for querying the historical information to increase network efficiency.

In some embodiments, the query is an interest packet that indicates one or more of: a routable prefix which includes one or more contiguous name components beginning from the most general level; a user identifier of the requesting entity; authentication information of the requesting entity; a type for the query; a string for the query; one or more parameters for the query; a function for the query; and a random nonce.

In some embodiments, the query is an interest packet with a name that is an HSVLI that includes contiguous name components ordered from a most general level to a most specific level, wherein the name includes one or more of: a routable prefix which includes one or more contiguous name components beginning from the most general level; a user identifier of the requesting entity; authentication information of the requesting entity; a type for the query; a string for the query; one or more parameters for the query; a function for the query; and a random nonce.

In some embodiments, the method is performed by a requesting entity which is a component of a stack of communication modules, the responding entity is a local forwarder that services the stack, and the query is a control message that indicates one or more of: an identifier for the local forwarder; a component which is responsible for collecting and storing the historical information, wherein the component resides in the local forwarder; a type for the query; a string for the query; one or more parameters for the query; and a function for the query.

In some embodiments, the operation is one or more of: setting or changing a window size; setting or changing a rate of transmission for re-transmitted interests; setting or changing a rate of transmission for original interests, wherein an original interest is not a re-transmitted interest; and an operation related to increasing the efficiency of the network.

In some embodiments, the query includes a command to perform a function on the historical information, and the function includes one or more of: computing an estimate of an average round trip time for an interest and a corresponding content object based on the name prefix, wherein a round trip time begins when an interest is transmitted and ends when a corresponding content object is received, or begins when an interest is received and ends when a corresponding content object is transmitted, wherein the estimate is based on a plurality of average round trip times for a corresponding plurality of related namespaces that share at least one name prefix; computing an estimate of a size of a transmission window based on a number of outstanding interests for the name prefix for a predetermined period of time; and performing a function based on one or more interests as input, wherein an output for the function is a variable which can be stored by the system, wherein the function is defined by the system or a user of the system.

In some embodiments, the method is performed by a requesting entity which is one or more of: an application associated with a first stack, wherein the responding entity resides in or is associated with the first stack; an application associated with a second stack that is different from the first stack; a stack component of the first stack, wherein the stack component is different from the responding entity; a stack component of the second stack; and any other element or node in the network.

In some embodiments, the responding entity resides in one or more of: an application; a single stack; a shared stack; a single forwarder; a shared forwarder; and any node in a network.

In some embodiments, the historical information associated with the packets is one or more of: a round trip time that begins when an outgoing interest is transmitted and ends when a corresponding incoming content object is received; a number of outgoing interests for which a corresponding incoming content object has not been received; a number of outgoing interests for which a corresponding incoming content object is received based on a predetermined amount of time or the round trip time; a number of bytes correctly retrieved based on the predetermined amount of time or the round trip time; a number of outgoing interests that time out based on the predetermined amount of time or the round trip time; a number of outgoing interests which are retransmitted based on the predetermined amount of time or the round trip time; a number of re-transmitted outgoing interests that time out based on the predetermined amount of time or the round trip time; a number of interest return messages received based on the predetermined amount of time or the round trip time, wherein an interest return message is received in response to an outgoing interest and is identified based on a code indicated in the message; a number of outgoing interests aggregated based on the predetermined amount of time or the round trip time; a number of active upstream paths identified for a given time; a strategy for forwarding packets; a first number of transmitted original interests, wherein an original interest is not a re-transmitted interest, and wherein the first number of original interests include names that share one or more name prefixes; a second number of transmitted original interests, wherein the second number of original interests include names that do not share any name prefixes; a first number of active entries in a forwarding information base, wherein the first number of entries include names that share one or more name prefixes; and a second number of active entries in a forwarding information base, wherein the second number of entries include names that do not share any name prefixes.

In some embodiments, the historical information associated with the packets is one or more of: a round trip time that begins when an incoming interest is received and ends when a corresponding incoming content object is transmitted; a number of incoming interests for which a corresponding outgoing content object has not been transmitted; a number of incoming interests for which a corresponding outgoing content object is transmitted based on a predetermined amount of time or the round trip time; a number of bytes correctly retrieved based on the predetermined amount of time or the round trip time; a number of incoming interests that time out based on the predetermined amount of time or the round trip time; a number of re-transmitted incoming interests based on the predetermined amount of time or the round trip time; a number of re-transmitted incoming interests that time out based on the predetermined amount of time or the round trip time; a number of interest return messages transmitted based on the predetermined amount of time or the round trip time, wherein an interest return message is transmitted in response to an incoming interest and is identified based on a code indicated in the message; and a number of incoming interests aggregated based on a predetermined amount of time or a round trip time.

Another embodiment provides a system that facilitates querying of historical network information. During operation, the system receives a query from a requesting entity for historical information associated with interest and corresponding content object packets. In response to authenticating the requesting entity, the system transmits the queried historical information, which causes the requesting entity to perform an operation to increase network efficiency based on the historical information, thereby facilitating a protocol for querying the historical information to increase network efficiency.

In some embodiments, the requesting entity is one or more of: an application associated with a first stack, wherein the responding entity resides in the first stack; an application associated with a second stack that is different from the first stack; a stack component of the first stack, wherein the stack component is different from the responding entity; a stack component of the second stack; and any other element or node in the network.

In some embodiments, the method is performed by a responding entity which resides in one or more of: an application; a single stack; a shared stack; a single forwarder; a shared forwarder; and any node in a network.

BRIEF DESCRIPTION OF THE FIGURES

In the figures, like reference numerals refer to the same figure elements.

DETAILED DESCRIPTION

Figure 1:
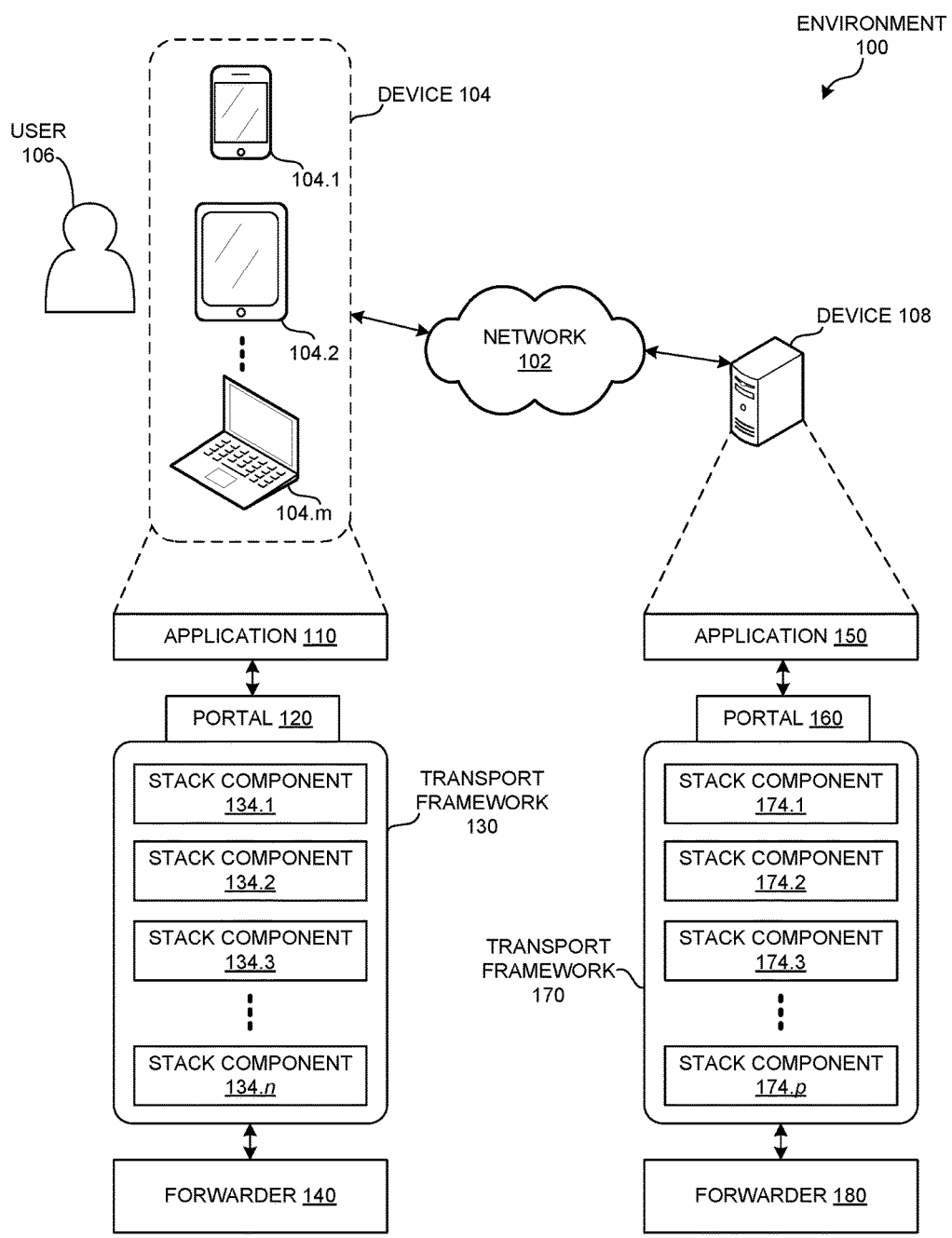
FIG. 1 illustrates an exemplary environment which facilitates querying of historical network information in a content centric network, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system for querying historical network information in a CCN which facilitates a system user to perform a function that increases overall network efficiency. One aspect of network efficiency is flow and congestion control. Some transport protocols implement this control by maintaining a sliding window of a size "w" that changes based on network conditions. The window size w is dynamically changed based on the perceived and measured performance of the network. For example, if the protocol determines congestion, e.g., due to heavy traffic of neighboring nodes, a consumer can decrease w so that fewer messages are sent to the network. Similarly, if the protocol determines that the network is not congested, the consumer can increase w so that more messages can be sent for better throughput and latency performance.

In a CCN transport protocol (e.g., ICP, CCTCP and other variants), a similar TCP-like mechanism is used to control flow and congestion by maintaining a window of outstanding interests. Recall that traffic in a CCN is symmetric, where a single interest returns a corresponding content object (or an interest return, as described in U.S. patent application Ser. No. 14/334,530). Thus, historical information regarding a given CCN namespace (e.g., a name prefix) may be collected by a network entity through which CCN packets (e.g., interests and content objects) flow. Embodiments of the present invention provide a system and protocol for a system user to query the network for historical network information collected by a generic "collector component." The historical information relates to outgoing interests and incoming content objects, and to incoming interests and outgoing content objects. The collector component, as the responding network entity, can reside in an application, a single or shared stack, a single or shared forwarder, or any node in the network. The system user, as the requesting entity, can be an application associated with a first stack, where the collector component resides in or is associated with the first stack, or an application associated with a second stack. The requesting entity can also be a stack component of the first stack, a stack component of the second stack, or any other element or node in the network.

The query can be in the form of an interest message or a control message. For example, if the requesting entity is an application or a stack component associated with a stack which the collector component neither resides in nor is associated with, the query can take the form of an interest message (as described below in relation to FIGS. 3A-3C). If the requesting entity is an application or a stack component of the same stack that the collector component resides in or is associated with, the query can take the form of a control message sent to the forwarder for the local host device (as described below in relation to FIGS. 3D-3E).

The system can collect historical information for each namespace identified in a set of messages. A namespace is a CCN prefix (i.e., one or more contiguous name components beginning from the most general level) and a CCN name may have multiple namespaces or prefixes. For example, the name "/a/b/c" has three namespaces: "/a"; "/a/b"; and "/a/b/c."

In CCN, each piece of content is individually named, and each piece of data is bound to a unique name that distinguishes the data from any other piece of data, such as other versions of the same data or data from other sources. This unique name allows a network device to request the data by disseminating a request or an interest that indicates the unique name, and can obtain the data independent from the data's storage location, network location, application, and means of transportation. The following terms are used to describe the CCN architecture:

Content Object (or "Content Object"):

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HS-VLI). The HSVLI can be divided into several hierarchical components, which can be structured in various ways. For example, the individual name components parc, home, ccn, and test.txt can be structured in a left-oriented prefix-major fashion to form the name "/parc/home/ccn/test.txt." Thus, the name "/parc/home/ccn" can be a "parent" or "prefix" of "/parc/home/ccn/test.txt." Additional components can be used to distinguish between different versions of the content item, such as a collaborative document. The HSVLI can also include contiguous name components ordered from a most general level to a most specific level.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814, which is herein incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest (or "Interest"):

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

The methods disclosed herein are not limited to CCN networks and are applicable to other architectures as well. A description of a CCN architecture is described in U.S. patent application Ser. No. 12/338,175, which is herein incorporated by reference.

Exemplary Network and Communication

FIG. 1 illustrates an exemplary environment 100 which facilitates querying of historical network information in a content centric network, in accordance with an embodiment of the present invention. Computing environment 100 can include a computer network 102, such as a CCN. Environment 100 can also include a user 106 associated with a local computing device 104, and a remote computing device 108. Devices 104 and 108 can have internal transport stacks (e.g., associated with transport frameworks 130 and 170, respectively) that exchange network packets with each other over network 102. Network packets can include interest packets and content object packets.

In a traditional IP architecture, a forwarder is an IP-based forwarder that looks at the header of a packet to determine the source and the destination for the packet, and forwards the packet to the destination. The stack performs TCP/UDP, and an application interacts with the stack via a socket. In contrast, device 104 of the present invention does not use a conventional "stack." Rather, device 104 via an application 110 can request a portal API instance corresponding to a portal 120 which corresponds to transport framework 130. Similarly, device 108 via an application 150 can request a portal API instance corresponding to a portal 160 which corresponds to transport framework 170.

Device 104 can include any computing device coupled to network 102, such as a smartphone 104.1, a tablet computer 104.2, and/or a server or personal computer 104.*m*. Specifically, device 104 can include application 110 which communicates via portal 120 with transport framework 130. Transport framework 130 can include stack components 134.1-134.*n*. Device 104 can also include forwarder 140 (e.g., a network interface card, or a router in a local area network) which can transfer packets between a stack (and individual stack components) of transport framework 130 and network 102. Similarly, device 108 can include any computing device coupled to network 102, such as a server or an end host device. Device 108 can include application 150 which communicates via portal 160 with transport framework 170. Transport framework 170 can include stack components 174.1-174.*p*. Device 108 can also include a forwarder 180 which can transfer packets between a stack (and individual stack components) of transport framework 170 and network 102. Forwarders 140 and 180 can also facilitate the transfer of packets directly between individual stack components 134.1-134.*n* and 174.1-174.*p*, respectively.

Exemplary Transport Frameworks

Figure 2A:
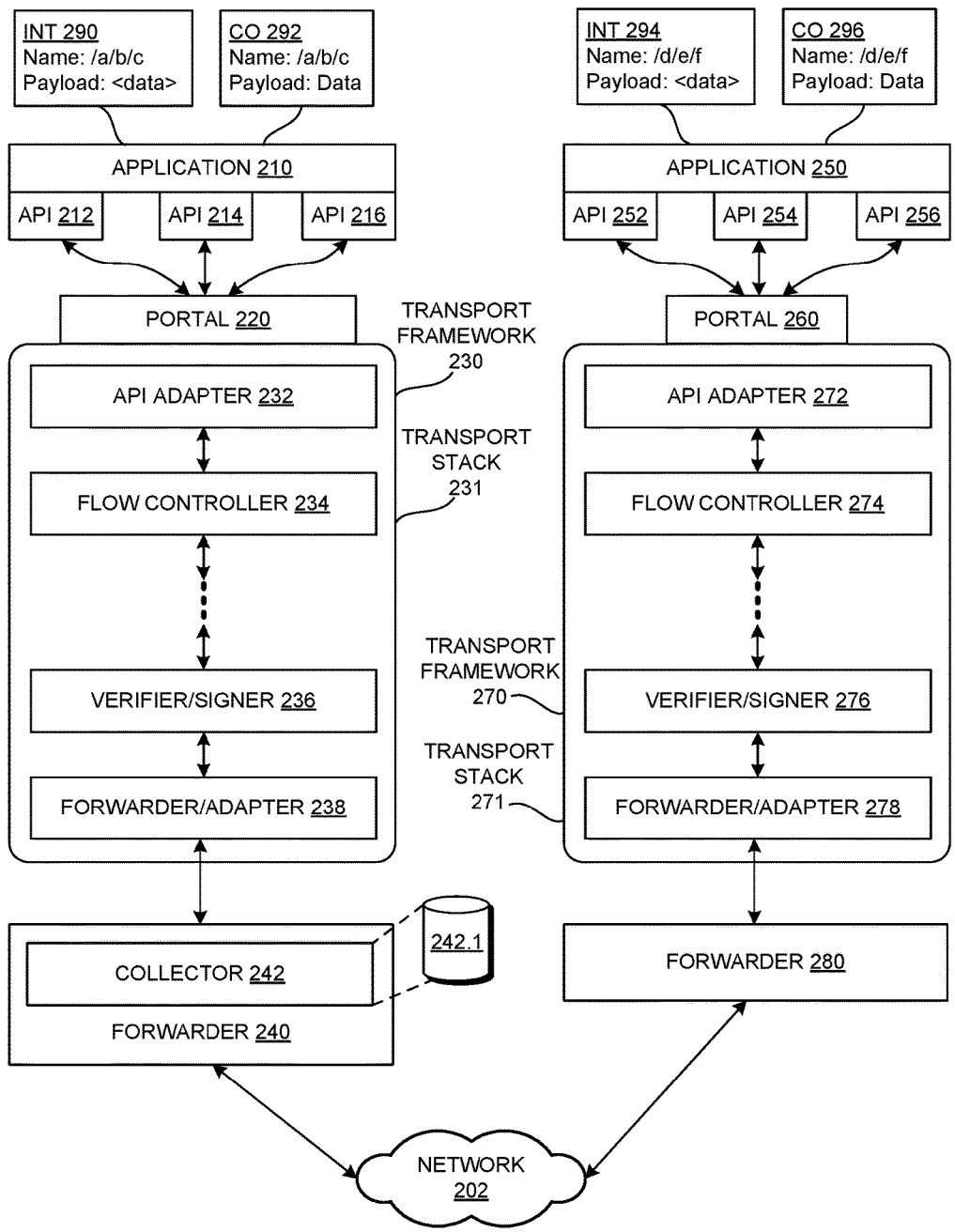
FIG. 2A illustrates an exemplary transport framework which facilitates querying of historical network information in a content centric network, wherein a collector component resides in a single forwarder, in accordance with an embodiment of the present invention.
Figure 2B:
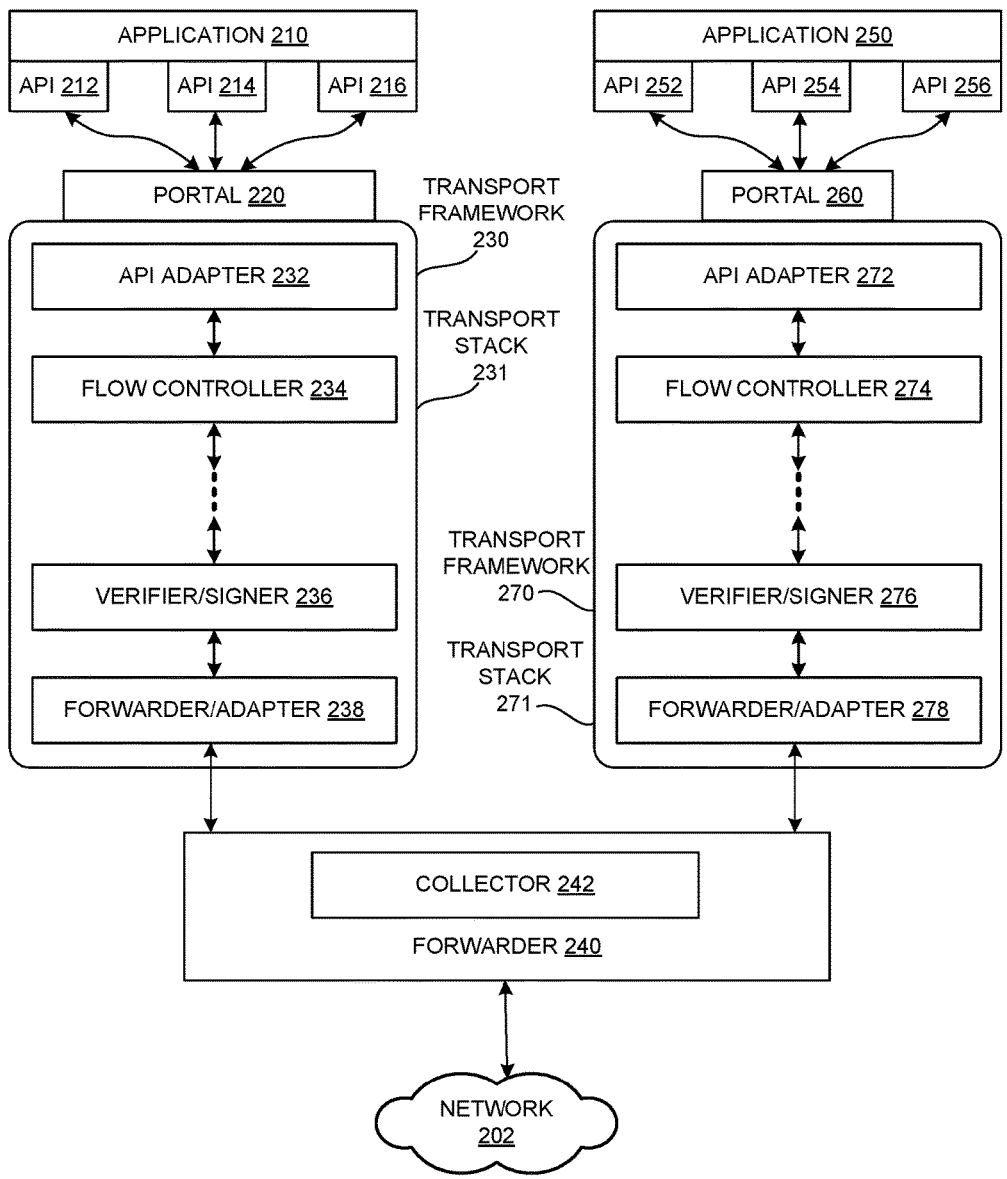
FIG. 2B illustrates an exemplary transport framework which facilitates querying of historical network information in a content centric network, wherein a collector component resides in a shared forwarder, in accordance with an embodiment of the present invention.
Figure 2C:
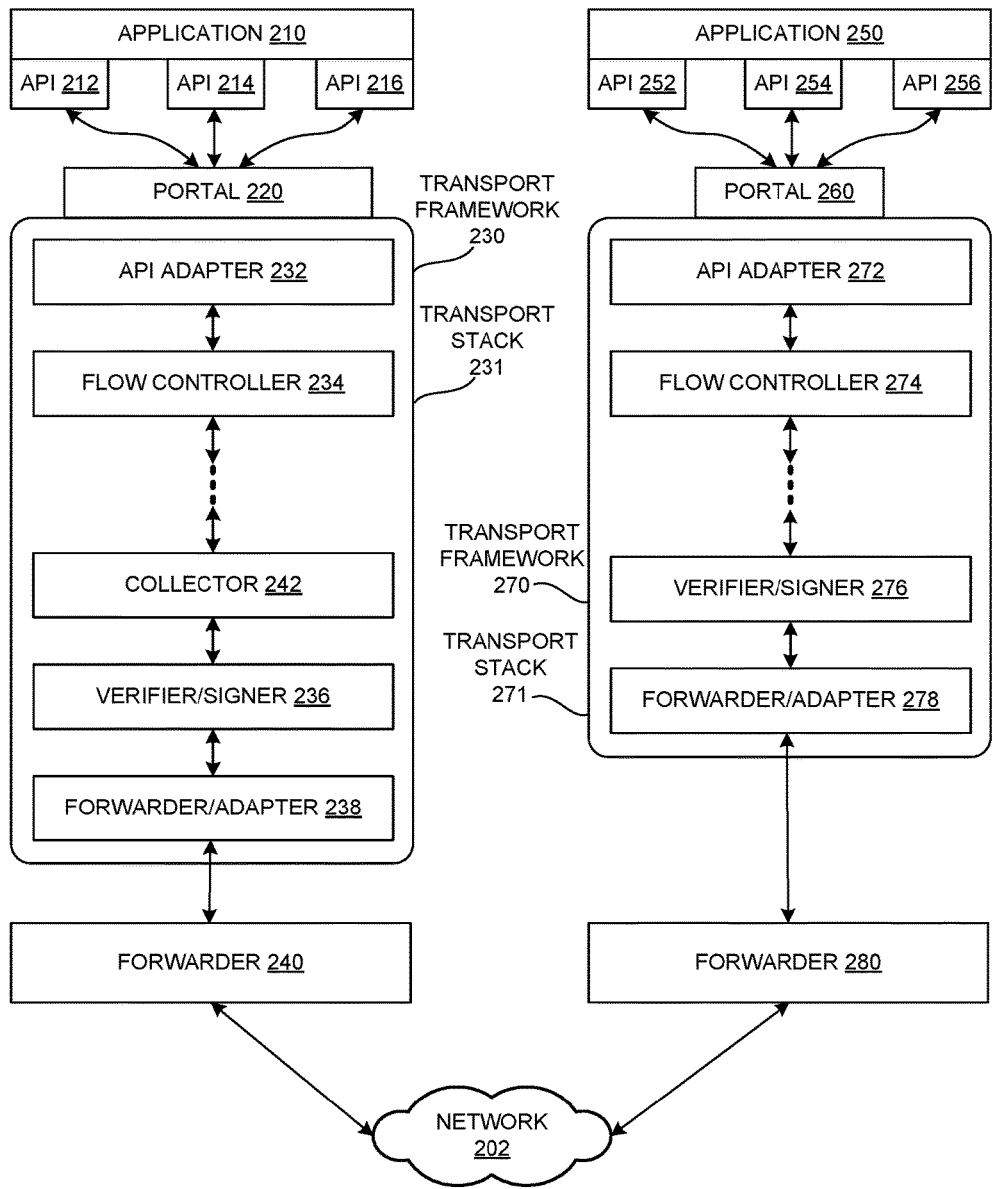
FIG. 2C illustrates an exemplary transport framework which facilitates querying of historical network information in a content centric network, wherein a collector component resides in a single transport stack of the transport framework, in accordance with an embodiment of the present invention.
Figure 2D:
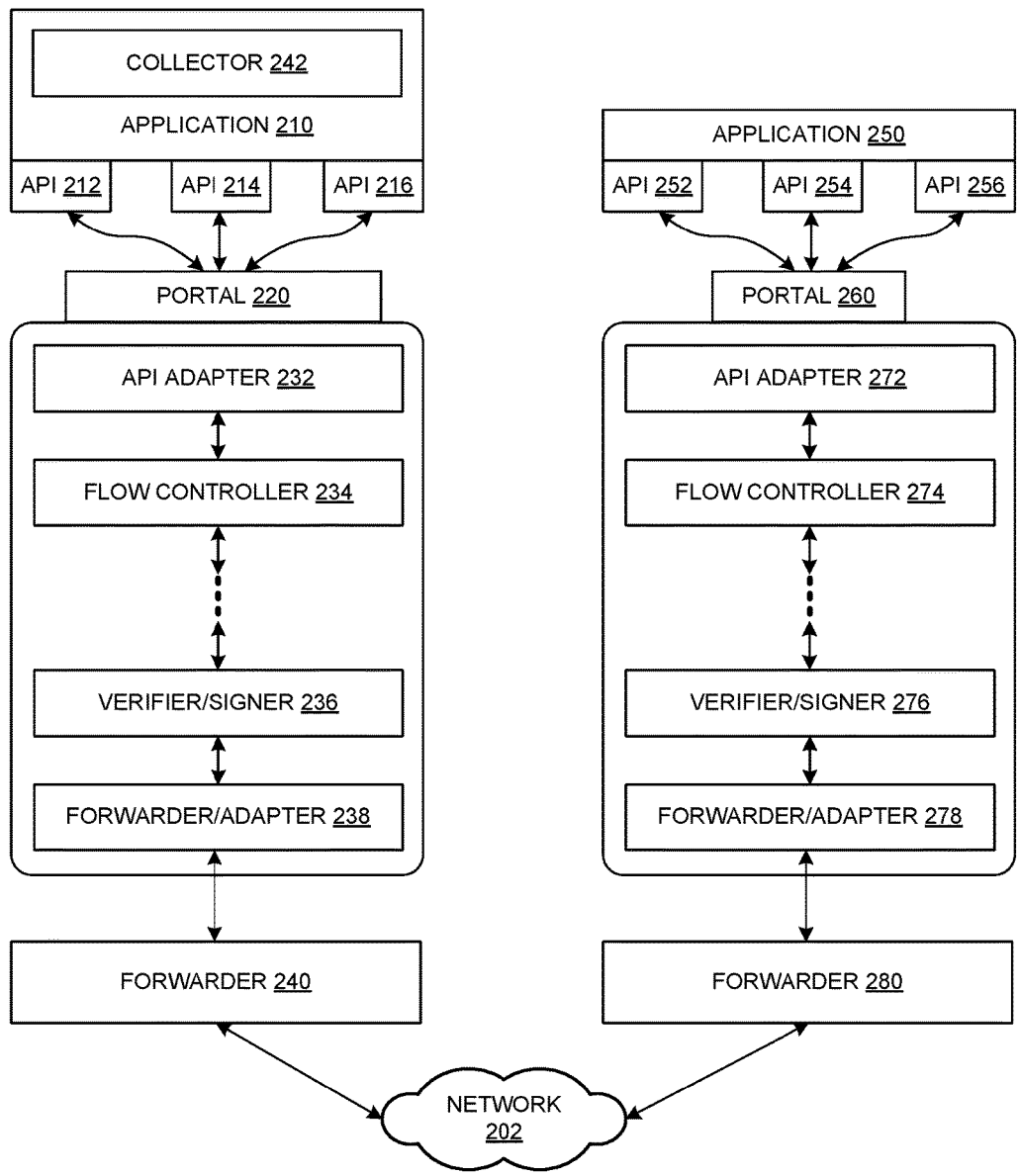
FIG. 2D illustrates an exemplary transport framework which facilitates querying of historical network information in a content centric network, wherein a collector component resides in an application associated with the transport framework, in accordance with an embodiment of the present invention.

In embodiments of the present invention, the collector component can be implemented in a CCN transport framework, and can reside in a forwarder (as in FIGS. 2A, 2B, and 2E), in a stack (as in FIG. 2C), or in an application (as in FIG. 2D). FIG. 2A illustrates an exemplary transport framework which facilitates querying of historical network information in a content centric network, wherein a collector component resides in a single forwarder, in accordance with an embodiment of the present invention. Applications 210 and 250 can reside on the same device or on difference devices which communicate via a network 202. Application 210 can use APIs 212, 214, and 216 to communicate over network 202, and APIs 212-216 can interact via a portal 220 with a transport framework 230. Transport framework 230 can include one or more transport stacks which each include multiple stack components or communication modules. In FIG. 2A, transport framework 230 depicts one transport stack (e.g., a transport stack 231) which includes stack components 232, 234, 236, and 238. An API adapter 232 can communicate between an API and a specific transport stack and transport framework 230. A flow controller 234 can shape and manage traffic, pipeline and transmit interests, and order content objects. A verifier/signer 236 can encode and sign content objects destined for a network element, decode and verify content objects destined for the application, encode interests destined for a network element, and decode interests destined for the application. A forwarder/adapter 238 can communicate with a forwarder 240. Forwarder 240 can communicate with other forwarders over network 202.

A collector component 242 can reside inside forwarder 240 (or inside forwarder 280, not shown). Other stack components (not shown) can include functionality related to security (e.g., encryption, decryption, authentication, data signing, signature verification, trust assessment, and filtering), data-processing (e.g., encoding, decoding, encapsulating, decapsulating, transcoding, compression, extraction, and decompression), and storage (e.g., data storage, data retrieval from storage, deduplication, segmentation, and versioning).

Similarly, application 250 can use APIs 252, 254, and 256 to communicate over network 202, and APIs 252-256 can interact via a portal 260 with a transport framework 270. Transport framework 270 can include one or more transport stacks which each include multiple stack components or communication modules. In FIG. 2A, transport framework 270 depicts one transport stack (e.g., a transport stack 271) which includes the following stack components: an API adapter 272; a flow controller 274; a verifier/signer 276; and a forwarder/adapter 278 which can communicate with a forwarder 280. Forwarder 280 can communicate with forwarder 240 over network 202. Application 210 can be associated with a consumer or a client computing device, and application 250 can be associated with a producer or a content producing device.

During operation, collector 242 residing in forwarder 240 can monitor a plurality of packets which are outgoing interests and incoming content objects. For example, application 210 can generate and send an interest 290 with a name of "/a/b/c," via portal instance 220 through stack 231. As interest 290 leaves stack 231, it passes through forwarder 240 and collector 242. Collector 242 can monitor the time at which interest 290 is transmitted. Interest 290 can then travel over network 202, and through, e.g., forwarder 280 to be satisfied by application 250 associated with stack 271. Application 250 can generate a responsive content object 292 with a name of "/a/b/c" and a payload of "Data." Content object 293 can travel via forwarder 280 to forwarder 240 over network 202. Collector 242 can note the time that it receives responsive incoming content object 292, and record in a storage device 242.1 the round trip time associated with the multiple namespaces included in the name "/a/b/c" (i.e., "/a," "/a/b," and "/a/b/c"). Collector 242 can also store in storage device 242.1 other historical information associated with a given namespace, as described below in the section entitled "Exemplary Historical Information." Storage device 242.1 can be accessed solely by collector 242 or shared with other components or elements.

Collector 242 can also monitor an incoming interest 294 (with a name of "/d/e/f" sent by application 250 via forwarder 280) by monitoring the time at which interest 294 is received. Collector 242 can subsequently monitor and record the time that an outgoing responsive content object 296 is transmitted, where content object 296 has a name of "/d/e/f" and is sent by application 210 via forwarder 240. Collector 242 can also monitor and record the round trip time associated with the multiple namespaces included in the name "/d/e/f" (i.e., "/d," "/d/e," and "/d/e/f") as well as other historical information.

Thus, collector 242 can obtain and store various historical information related to a given namespace. Any requesting entity (e.g., a user of the system) can subsequently query the component for the historical information. A requesting entity can be: an application associated with a first stack, where the collector component resides in the first stack (e.g., application 210); an application associated with a second stack that is different from the first stack (e.g., application 250); a stack component of the first stack, wherein the stack component is different from the collector component (e.g., flow controller 234); a stack component of the second stack (e.g., flow controller 274); and any other element or node in the network (not shown).

FIG. 2B illustrates an exemplary transport framework which facilitates querying of historical network information in a content centric network, wherein a collector component resides in a shared forwarder, in accordance with an embodiment of the present invention. The framework in FIG. 2B corresponds to the framework in FIG. 2A, with the difference being that applications 210 and 250, and stacks 231 and 271, respectively, are both associated with forwarder 240. In FIG. 2B, collector 242 resides in forwarder 240 and can thus monitor all traffic that passes through forwarder 240. Forwarder 240 is shared by applications 210 and 250, which can reside on the same device. Collector 242 can monitor packets transmitted to and received from network 202 in a similar fashion as described above in FIG. 2A. For example, collector 242 can monitor outgoing interests transmitted from application 210 through stack 231 via network 202 to another network node (not shown) as well as incoming responsive content objects received via network 202. Collector 242 can also monitor incoming interests transmitted to application 250 through stack 271 via network 202 as well as outgoing responsive content objects sent via network 202. Collector 242 can store historical information collected and associated with the monitored packets (e.g., in storage device 242.1, not shown in FIG. 2B).

FIG. 2C illustrates an exemplary transport framework which facilitates querying of historical network information in a content centric network, wherein a collector component resides in a single transport stack of the transport framework, in accordance with an embodiment of the present invention. The framework in FIG. 2C corresponds to the framework in FIG. 2A, with the difference being that collector 242 is a stack component that resides inside stack 231. A requesting entity can submit a query for historical information associated with a given namespace to collector 242. A transport stack name scheme, including submitting a query directly to a stack component, is described in U.S. patent application Ser. No. 14/746,490. Collector 242 can store historical information collected and associated with the monitored packets (e.g., in storage device 242.1, not shown in FIG. 2C).

FIG. 2D illustrates an exemplary transport framework which facilitates querying of historical network information in a content centric network, wherein a collector component resides in an application associated with the transport framework, in accordance with an embodiment of the present invention. The framework in FIG. 2D corresponds to the framework in FIG. 2A, with the difference being that collector 242 resides in application 210. Again, collector 242 can store historical information collected and associated with the monitored packets (e.g., in storage device 242.1, not shown in FIG. 2D).

Local Message Stream Co-Processor Example

Figure 2E:
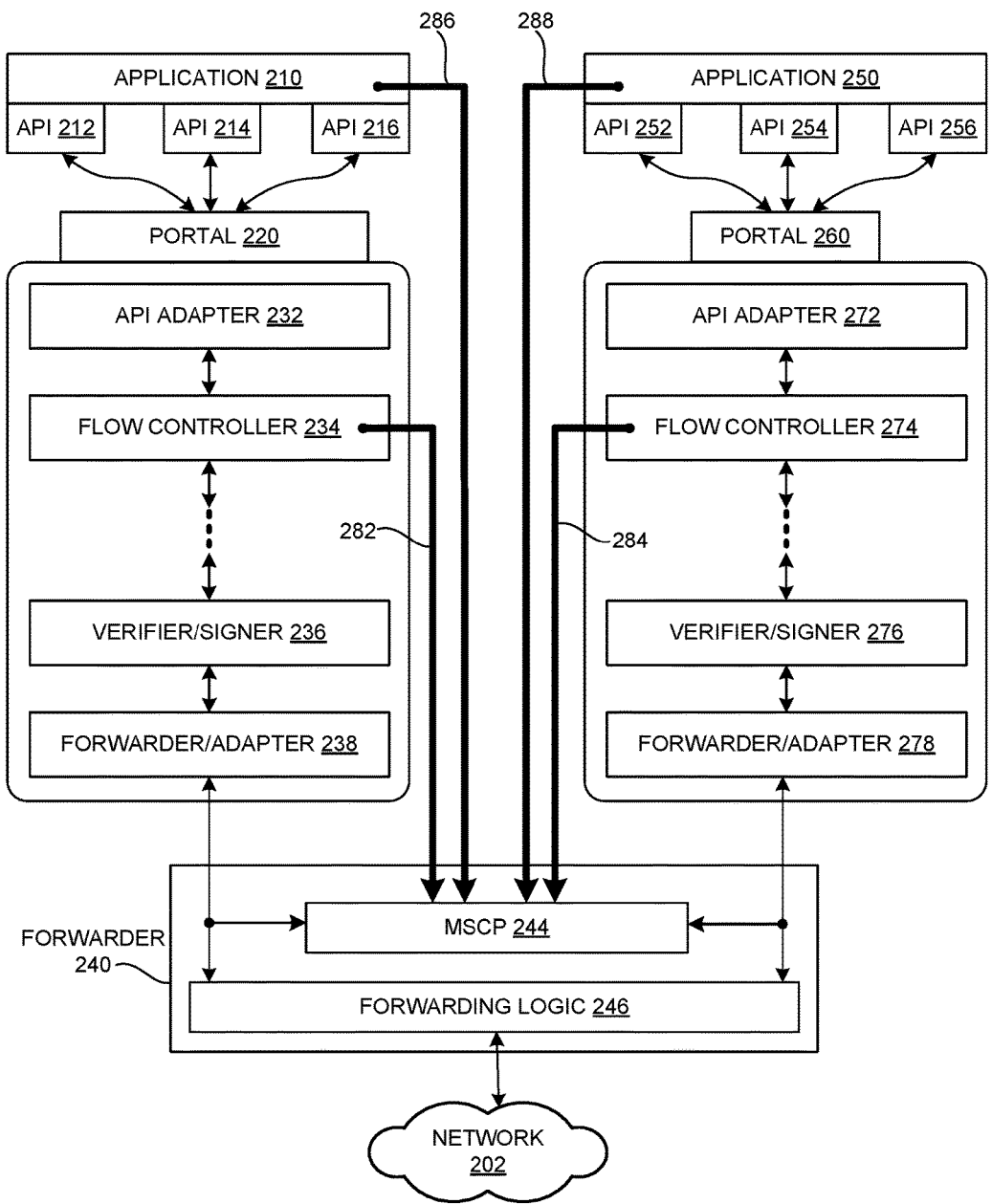
FIG. 2E illustrates an exemplary transport framework which facilitates querying of historical network information in a content centric network, wherein a collector component resides in a forwarder as a message stream co-processor element, in accordance with an embodiment of the present invention.

FIG. 2E illustrates an exemplary transport framework which facilitates querying of historical network information in a content centric network, wherein a collector component resides in a forwarder as a message stream co-processor element, in accordance with an embodiment of the present invention. The framework in FIG. 2E corresponds to the framework in FIG. 2C, and illustrates an embodiment in which the collector component is a local message stream co-processor. Recall that CCN end-hosts have a single forwarder that services all ingress and egress interest and content objects to and from applications (i.e., incoming interests and corresponding outgoing content objects, and outgoing interests and corresponding incoming content objects). A standard CCN forwarder maintains only a minimal amount of information to forward CCN messages: a forwarding information base ("FIB"), a pending interest table ("PIT"), and an optional content store ("CS" or cache). In this embodiment, forwarder 240 also includes a specific collector component which is a message stream co-processor ("MSCP") 244. The functionality of MSCP 244 is unique to the end-host that it services and may be configured at startup or at runtime. For example, MSCP 244 may be configured to collect and store only historical information regarding interest and content object exchanges, which can include the average number of interests issued for a specific namespace or prefix for a given period of time. Other types of historical information can also be collected and stored, as described herein (e.g., in storage device 242.1, not shown in FIG. 2E).

Because forwarder 240, and thus MSCP 244, processes all messages for all applications on a given system (e.g., a CCN end-host), maintaining the privacy of the messages is a key feature. The operating system can define and limit the functionality of MSCP 244, including the disclosure of collected historical information to authorized entities only. For example, requesting entity application 210 can transmit a query 286 to MSCP 244, and requesting entity flow controller 234 can also transmit a query 282 to MSCP 244. Queries 282 and 286 may include a request for historical information collected by MSCP 244. Since the requesting entities (e.g., application 210 and flow controller 234) are associated with the end host serviced by MSCP 244, MSCP 244 can identify the requesting entities as authorized entities and transmit the requested historical information back in response to queries 282 and 286. Similarly, application 250 and flow controller 274 may, respectively, submit queries 288 and 284 to MSCP 244, and in response receive the requested historical information from MSCP 244.

Thus, MSCP 244 can perform like a black box that consumes CCN messages for processing. The limits of this processing are unbounded. MSCP 244 can provide whatever is needed for its given end-host and associated applications. For example, MSCP 244 may be configured to count the number of processed messages, to log the names of all outgoing interest messages to a system log, or to collect any of the types of historical information described herein.

Exemplary Historical Information

Consider the following sequence of n interest messages issued by different applications on the same end-host, i.e., $I_j$ for j=1, ..., n:

$$I_1 = /a/b1/c1$$
$$I_2 = /a/b1/c2$$
$$I_3 = /a/b1/c3$$
$$...$$
$$I_{i-1} = /a/b1/ci$$
$$I_i = /a/b2/c1$$
$$...$$
$$I_n = /a/b2/fileN$$

In a window that includes each of interests $I_j$, the "/a" namespace has n interests, the "/a/b1" namespace has i interests, and the "/a/b2" namespace has (n−i+1) interests. Each of interests $I_j$ has a corresponding content object response, $C_j$.

For each of interests $I_j$, the collector component can collect various types of historical information based on each particular namespace, including the items in the following non-exhaustive list:

1) A round trip time ("RTT") that begins when an outgoing/incoming interest is transmitted and ends when a corresponding incoming/outgoing content object is received;
2) A number of outgoing/incoming interests for which a corresponding incoming/outgoing content object has not been received (e.g., outstanding window size);
3) A number of outgoing/incoming interests for which a corresponding incoming/outgoing content object is received based on a predetermined amount of time or an RTT;
4) A number of bytes correctly retrieved based on a predetermined amount of time or an RTT;
5) A number of outgoing/incoming interests that time out based on a predetermined amount of time or an RTT;
6) A number of outgoing/incoming interests which are retransmitted based on a predetermined amount of time or an RTT;
7) A number of re-transmitted outgoing/incoming interests that time out based on a predetermined amount of time or an RTT;
8) A number of interest return messages received/transmitted based on a predetermined amount of time or an RTT, where an interest return message is identified based on a code indicated in the message;
9) A number of outgoing/incoming interests aggregated based on a predetermined amount of time or an RTT;
10) A number of active upstream paths identified for a given time;
11) A strategy for forwarding or processing packets;
12) A number of transmitted original interests, where an original interest is not a re-transmitted interest, wherein the number of original interests include names that share one or more name prefixes ("correlated") and names that do not share any name prefixes ("uncorrelated"); and
13) A number of active entries in a forwarding information base, where the number of entries include correlated and uncorrelated entries.

In addition, the collector component can perform a function or compute information based on the historical information. Examples include computation of the average RTT for a given namespace, an estimate of the transmission window size, and a user-defined function. In estimating the average RTT for a given namespace, consider the n interest messages issued by different applications on the same end-host, i.e., $I_j$ for j=1, ..., n. Recall that each of interests $I_j$ has a corresponding content object response, $C_j$. Let $r_j$ be the RTT of the issuance of the interest $I_j$ and the retrieval of the corresponding content object $C_j$, and assume that historical information is maintained for windows of size d<i and d<(n−i+1). Then, for each of the three namespaces (i.e., "/a," "/a/b1," and "/a/b2"), the collector component can compute a smoothed RTT average r[/a], r[/a/b1], and r[/a/b2]. These RTT averages can be computed based on any appropriate algorithm, e.g., as a weighted moving average or exponential moving average. Additionally, while an RTT computation may be based on time, it may also be based on other information such as hop counts for retrieved content objects.

In estimating the transmission window size, recall that the transmission window size is coupled to time in that the window size changes over time, depending on the behavior of the transport protocol. The goal of this historical information is not to anticipate the behavior of the transport protocol, but rather to passively measure the effects of the transport protocol. Consider a small (and configurable) time epoch "E." Given a frame of n interests $I_1, \ldots, I_n$, the collector component computes the number of outstanding interests for each namespace in the frame. The resultant number is treated as a sample in the given timeslot of size E. When the time slot advances, the new samples are computed. For example, in timeslot t1, there may be x outstanding interests for namespace "N." Then, in timeslot t2, there may be y outstanding interests for namespace N. Thus, the average window size may be approximately computed as (x+y)/2. The accuracy of this approximation depends on both the granularity of the timeslot (e.g., E) and the width of the frame. E may also be dynamically modified based on RTT estimations. For example, if the RTT estimation for a given namespace is small, then E may correspondingly be decreased. The value of E is typically less than the time it takes for the collector component to process all interests in a given frame.

In computing a user-defined function, the collector component can accept closures for processing streams of interests. The representation of a closure conforms to the interface for the stream processing. That is, the closure is a function which accepts a sequence of interests, produces an output, and may invoke other closures in the process. This can be compared to the "map-reduce" paradigm, where a user provides custom "map" and "reduce" functions and the framework invokes them accordingly. The processing functions for an interest stream may be designed to model the functional paradigm. One example of such a user-defined function is one which estimates the frequency at which interests are used for a given namespace. Another example is a function which estimates the frequency of message failures (e.g., interest returns) for a given namespace.

Exemplary Communication Via a Query that is an Interest Message

Figure 3A:
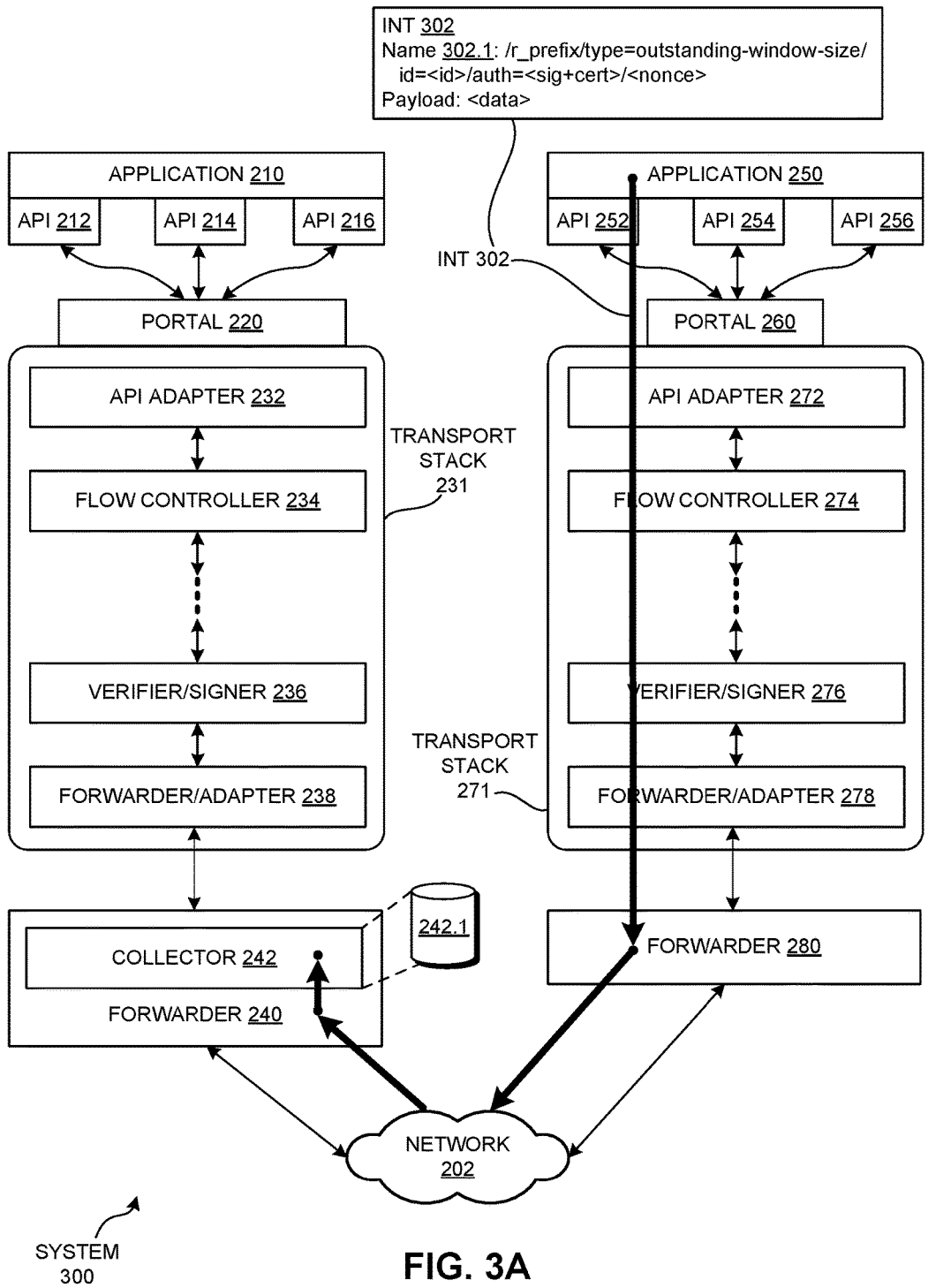
FIG. 3A illustrates an exemplary communication in a system which facilitates querying of historical network information in a content centric network, wherein the requesting entity is an application associated with a stack with which the collector component is not associated, in accordance with an embodiment of the present invention.

FIG. 3A illustrates an exemplary communication in a system 300 which facilitates querying of historical network information in a content centric network, wherein the requesting entity is an application associated with a stack with which the collector component is not associated, in accordance with an embodiment of the present invention. System 300 corresponds to the exemplary transport framework depicted and described in relation to FIG. 2A, where the collector component (e.g., collector 242) resides in the forwarder (e.g., forwarder 240). Recall that a requesting entity can be: an application associated with a first stack, where the collector component resides in or is associated with the first stack (e.g., application 210); an application associated with a second stack that is different from the first stack (e.g., application 250); a stack component of the first stack, wherein the stack component is different from the collector component (e.g., flow controller 234); a stack component of the second stack (e.g., flow controller 274); and any other element or node in the network (not shown). In system 300, the requesting entity is application 250, which is an application associated with a stack (e.g., stack 271) that is different from the first stack (e.g., stack 231), where the collector component resides in or is associated with the first stack (e.g., collector 242 resides in forwarder 240 and is not associated with stack 271).

Application 250 can generate an interest message 302 with a name 302.1 of the following format: "/r_prefix/type=outstanding-window-size/id=<id>/auth=<sig+cert>/<nonce>." The variables in name 302.1 can be defined as follows: "/r_prefix" is a routable name prefix which includes one or more contiguous name components ordered beginning from the most general level (e.g., "/a/b2/fileN" or "/parc/ccn/file1"); "type" indicates the type of command or query (e.g., an outstanding window size which corresponds to a number of outstanding interests for the routable prefix or namespace, a number of interests answered correctly in a specific period of time, and other examples as described above in the section entitled "Exemplary Historical Information"); "id" indicates a user identifier of the requesting entity (e.g., "<id>"); "auth" indicates authentication information of the requesting entity, which can include the signature and/or digital certificate of the requesting entity (e.g., "<sig+cert>"); and "<nonce>" is a randomly generated nonce to ensure both uniqueness and freshness.

In some embodiments, name 302.1 can include one or more specific namespaces of the routable prefix for which the historical information is requested. Furthermore, the variables defined above and depicted as included in the name for the interest can be included in other fields of the interest. In other words, the variables and information included in name 302.1 can alternatively be indicated in interest 302 in other fields (not shown).

In addition, name 302.1 can include a string for the query (e.g., "outstanding-window-size"), one or more parameters for the query, and a function for the query. For example, the function for the query can indicate a request for the responding entity (e.g., the collector component) to perform a function or compute information based on the historical information, such as an average RTT for a given namespace, an estimate of the transmission window size for a given namespace, or a user-defined function (as described above in the section entitled "Exemplary Historical Information"). Interest 312 can also include a payload 312.2 with a value of "<data>" (e.g., if the requesting entity needs to provide additional data for the collector component to retrieve specific historical information or to perform a function or other computation).

Collector 242, as the responding entity, can receive interest 302, perform a lookup in storage 242.1 for the queried historical information, and subsequently return a response which can be a content object (not shown) that includes the queried historical information. The responsive content object can travel on a reverse path as interest 302 back to application 250. If the query includes a command to perform a function, the responsive content object can include the result of the function. The function may be performed by collector 242, or by another responding entity.

Figure 3B:
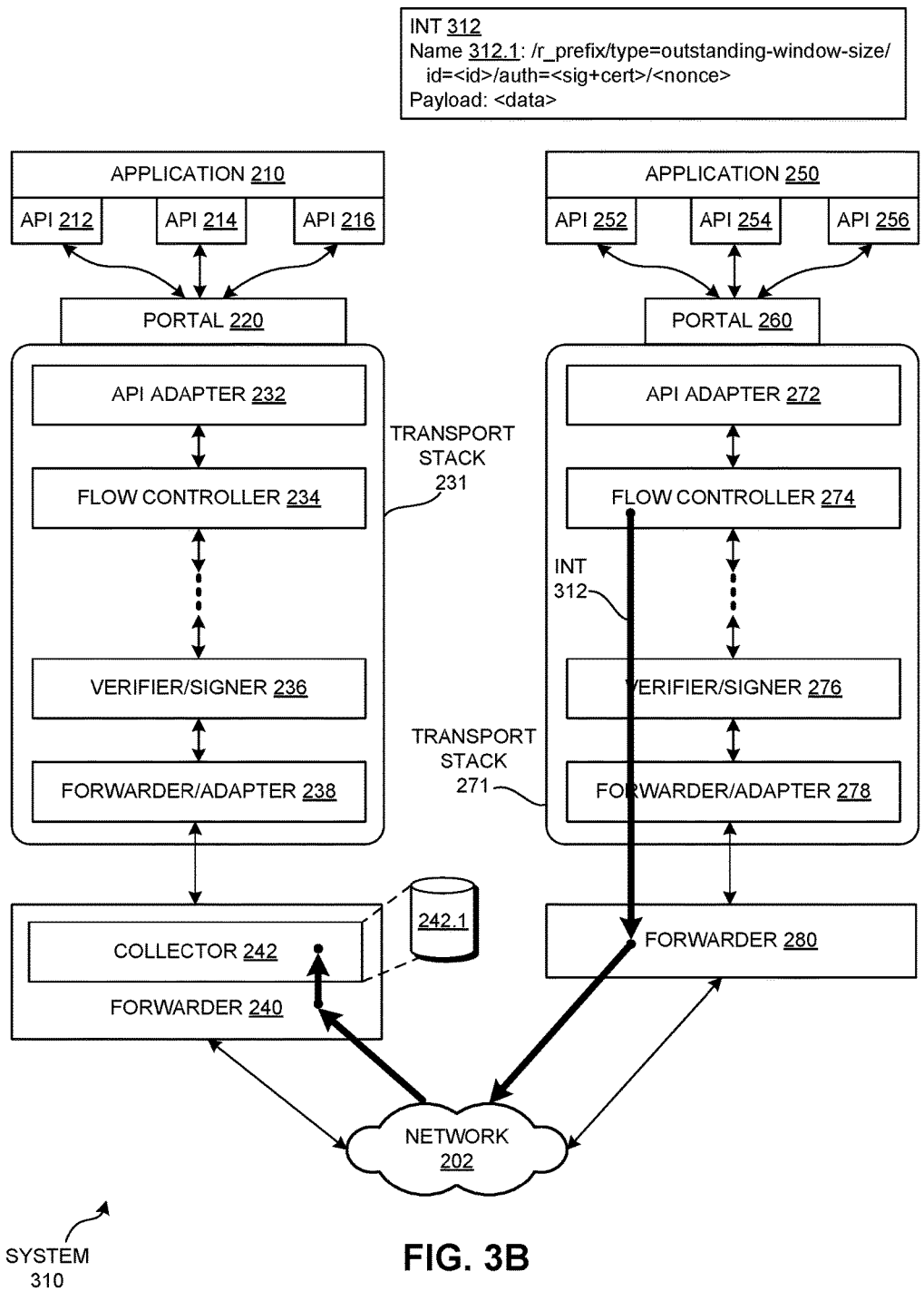
FIG. 3B illustrates an exemplary communication in a system which facilitates querying of historical network information in a content centric network, wherein the requesting entity is a stack component of a stack with which the collector component is not associated, in accordance with an embodiment of the present invention.

FIG. 3B illustrates an exemplary communication in a system 310 which facilitates querying of historical network information in a content centric network, wherein the requesting entity is a stack component of a stack with which the collector component is not associated, in accordance with an embodiment of the present invention. In system 310, the requesting entity is flow controller 274, which is a stack component of the second stack (e.g., flow controller 274 is a stack component of stack 271, which is a stack that is not associated with collector 242 of forwarder 240). Similar to application 250 of system 300 in FIG. 3A, flow controller 274 in FIG. 3B can generate an interest message 312 with a name 312.1 of the following format: "/r_prefix/ type=outstanding-window-size/id=<id>/auth=<sig+cert>/ <nonce>" (which is the same as the format for interest 302 with name 302.1 in FIG. 3A). Similar to the communication in FIG. 3A, collector 242 receives interest 312 and returns a responsive content object on a reverse path as interest 312 back to flow controller 274.

Figure 3C:
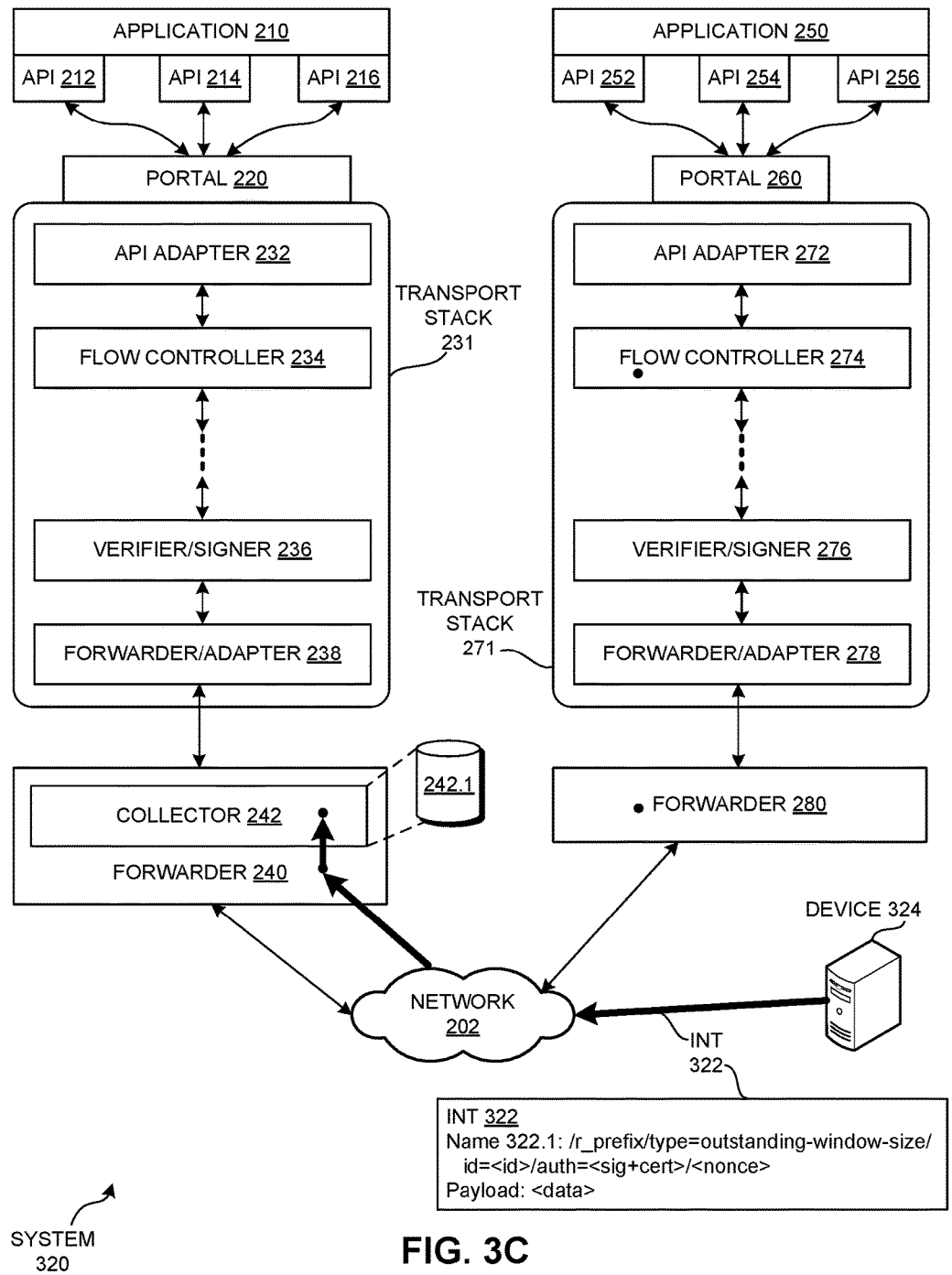
FIG. 3C illustrates an exemplary communication in a system which facilitates querying of historical network information in a content centric network, wherein the requesting entity is another network element or node, in accordance with an embodiment of the present invention.

FIG. 3C illustrates an exemplary communication in a system 320 which facilitates querying of historical network information in a content centric network, wherein the requesting entity is another network element or node, in accordance with an embodiment of the present invention. In system 320, the requesting entity is a network device 324, which is another element or node in the network. Similar to application 250 of system 300 in FIG. 3A, network device 324 can generate an interest message 322 with a name 322.1 of the following format: "/r_prefix/type=outstanding-window-size/id=<id>/auth=<sig+cert>/<nonce>" (which is the same as the format for interest 302 with name 302.1 in FIG. 3A). Similar to the communication in FIG. 3A, collector 242 receives interest 322 and returns a responsive content object on a reverse path as interest 322 back to device 324.

Exemplary Communication Via a Query that is a Control Message

Figure 3D:
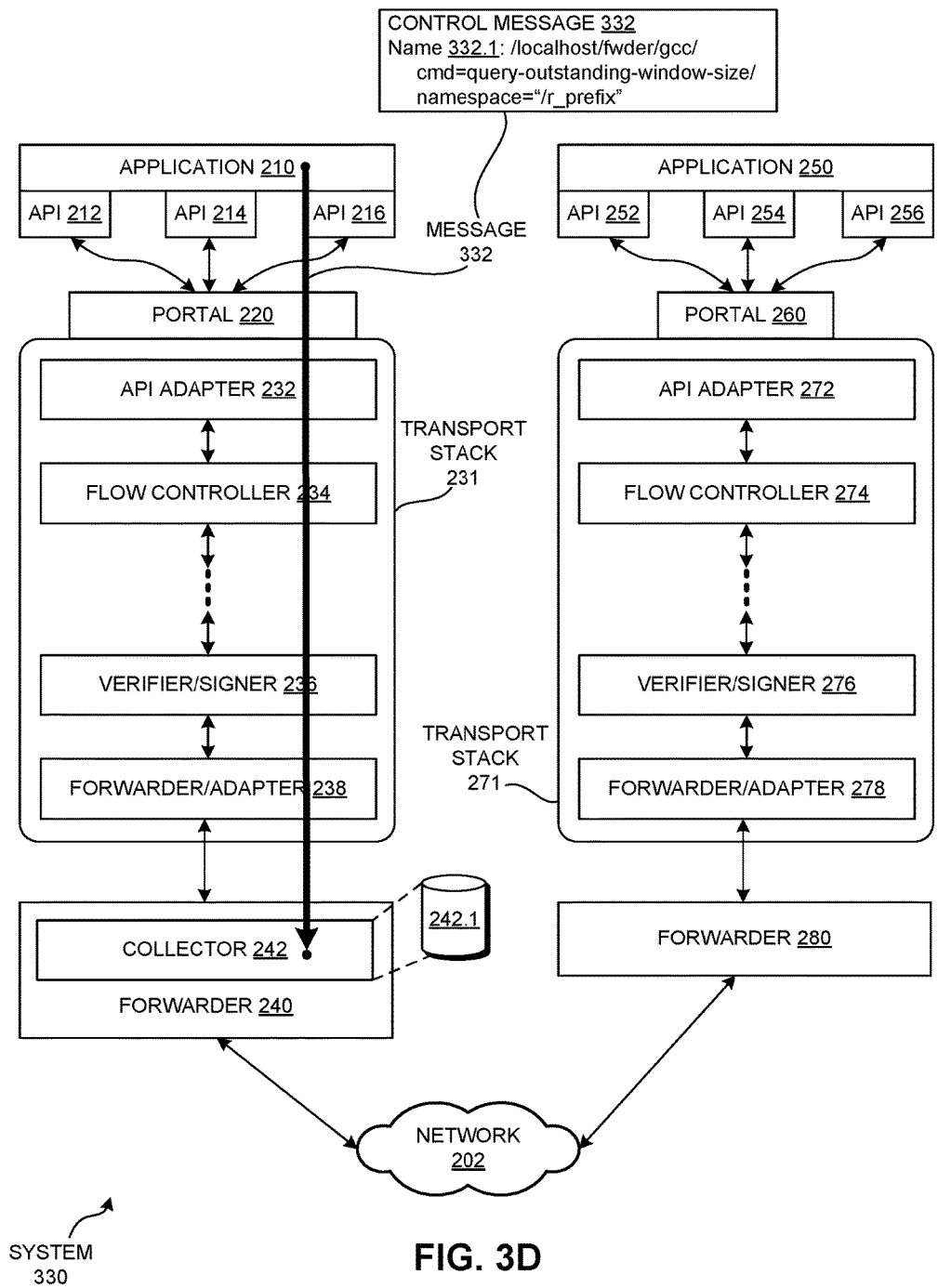
FIG. 3D illustrates an exemplary communication in a system which facilitates querying of historical network information in a content centric network, wherein the requesting entity is an application associated with the same stack with which the collector component is associated, in accordance with an embodiment of the present invention.

FIG. 3D illustrates an exemplary communication in a system 330 which facilitates querying of historical network information in a content centric network, wherein the requesting entity is an application associated with the same stack with which the collector component is associated, in accordance with an embodiment of the present invention. In system 330, the requesting entity is application 210, which is an application associated with the first stack (e.g., transport stack 231), where collector 242 is also associated with the first stack (e.g., collector 242 resides in forwarder 240 and is associated with transport stack 231). Application 210 can generate a control message 332 destined for collector 242 in local forwarder 240. Control message 332 can have a name 332.1 of the following format: "/localhost/fwder/gcc/cmd=query-outstanding-window-size/namespace=<namespace>/<nonce>." The variables in name 332.1 can be defined as follows: "/localhost" is the name for the device on which application 210, stack 231, and forwarder 240 reside; "/fwder" indicates that the control message is destined for the forwarder on the local device (e.g., forwarder 240); "/gcc" indicates the name of the specific collector component which resides inside the forwarder (e.g., "/gcc" for "general collector component" or "/mscp" for "message stream co-processor" as described in relation to FIG. 2E); "cmd" indicates the command or query (e.g., to retrieve the outstanding window size, which corresponds to a number of outstanding interests for an indicated namespace); "namespace" indicates the name prefix on which the command or query is based (e.g., a routable name prefix which includes one or more contiguous name components ordered beginning from the most general level, such as "/a/b2/fileN" or "/parc/ccn/file1"); and "<nonce>" is a randomly generated nonce that can guarantee both uniqueness and freshness. Similar to name 302.1 in FIG. 3A, name 332.1 in FIG. 3D can include a string for the query, one or more parameters for the query, and a function for the query.

Collector 242, as the responding entity, can receive control message 332, perform a lookup in storage 242.1 for the queried historical information, and subsequently return a response that includes the queried historical information (and, if the command includes a function, the result of the function). The response, which can be a content object, can travel back on a reverse path as control message 332 back to application 210.

Figure 3E:
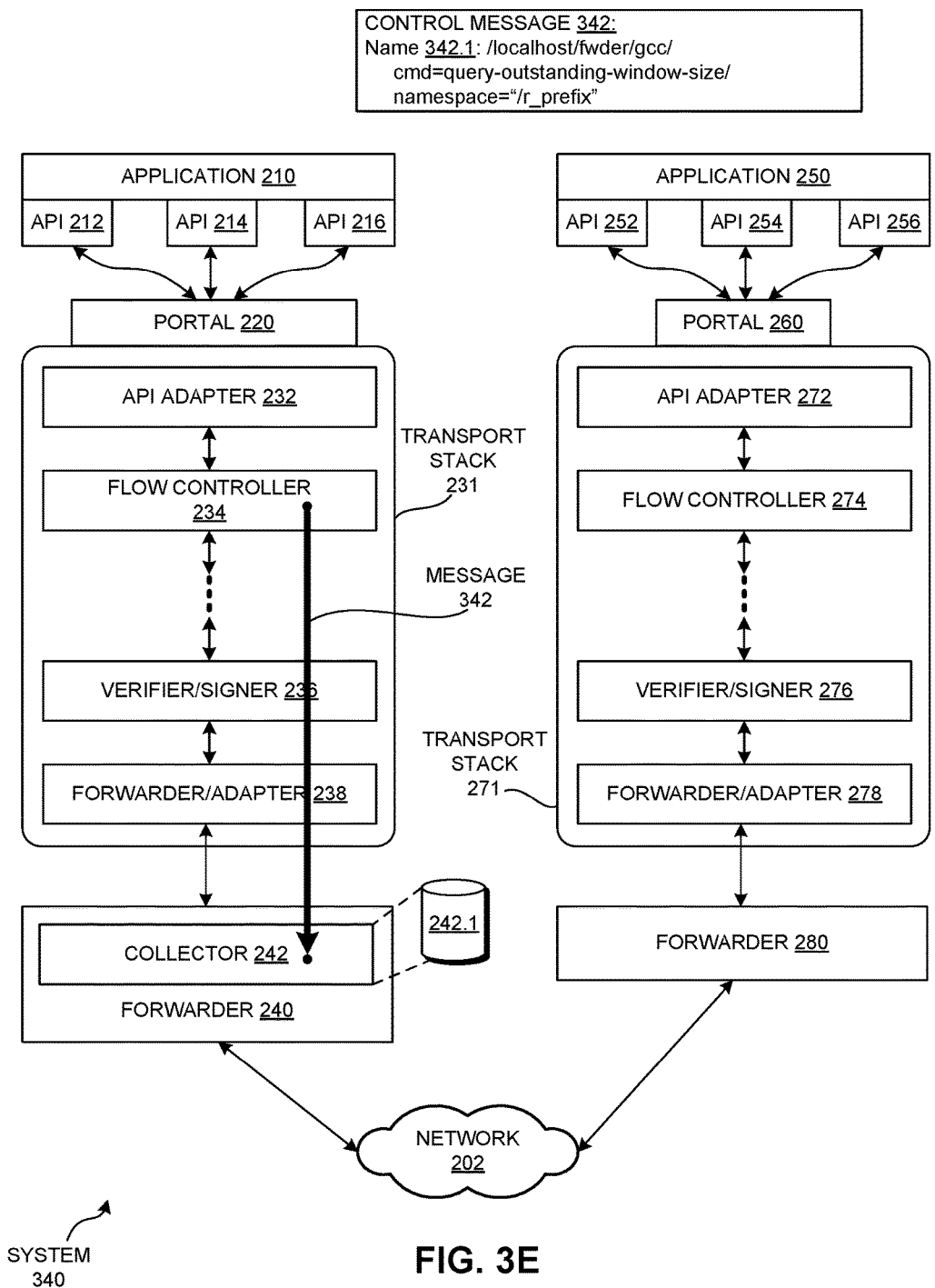
FIG. 3E illustrates an exemplary communication in a system which facilitates querying of historical network information in a content centric network, wherein the requesting entity is a stack component of the same stack with which the collector component is associated, in accordance with an embodiment of the present invention.

FIG. 3E illustrates an exemplary communication in a system 340 which facilitates querying of historical network information in a content centric network, wherein the requesting entity is a stack component of the same stack with which the collector component is associated, in accordance with an embodiment of the present invention. In system 340, the requesting entity is flow controller 234, which is a stack component of the same stack (e.g., stack 231) with which the collector component is associated (e.g., collector 242 resides in forwarder 240 and is associated with stack 231). Flow controller 234 can generate a control message 342 destined for collector 242 in local forwarder 240. Control message 342 can have a name 342.1 of the following format: "/localhost/fwder/gcc/cmd=query-outstanding-window-size/namespace=<namespace>/<nonce>" (which is the same as the format for control message 332 with name 332.1 in FIG. 3D). Similar to the communication in FIG. 3D, collector 242 receives control message 342 and returns a response on a reverse path as control message 342 back to flow controller 234.

Requesting Entity Queries for Historical Information

Figure 4:
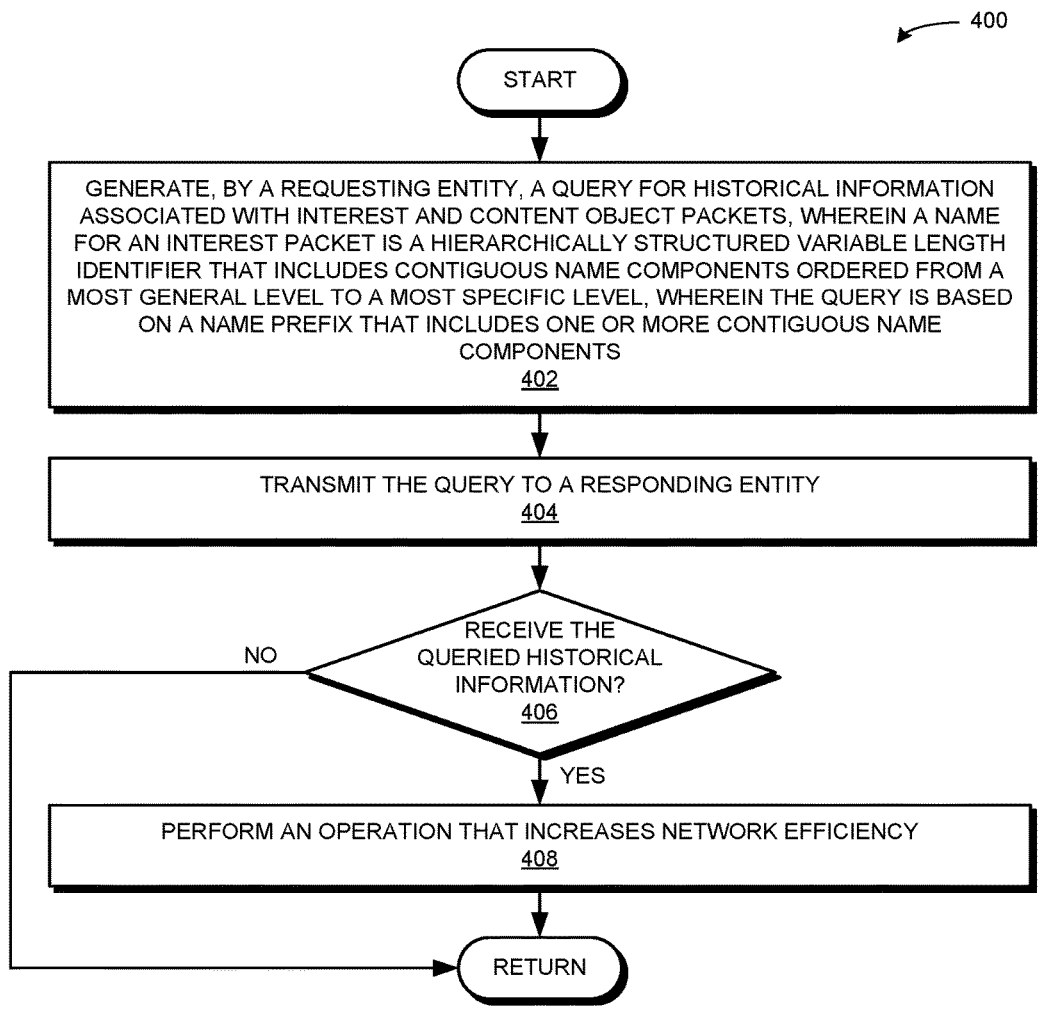
FIG. 4 presents a flow chart illustrating a method by a requesting entity for facilitating querying of historical network information in a content centric network, in accordance with an embodiment of the present invention.

FIG. 4 presents a flow chart 400 illustrating a method by a requesting entity for facilitating querying of historical network information in a content centric network, in accordance with an embodiment of the present invention. During operation, a requesting entity (such as a stack, a stack component, or an application in a CCN end-host device) generates a query for historical information associated with interest and content object packets (operation 402). A name for an interest packet is a hierarchically structured variable length identifier that includes contiguous name components ordered from a most general level to a most specific level, and the query is based on a name prefix that includes one or more contiguous name components. For example, the query may be for an outstanding window size for a given name prefix or namespace over a certain period of time (e.g., the number of outgoing interests for which a corresponding incoming content object has not been received for the name prefix "/a/b1"). The query can be in the form of an interest message or a control message, as described above in relation to FIGS. 3A-3E.

The requesting entity transmits the query to a responding entity (operation 404). The requesting entity determines whether it receives the queried historical information (decision 406). If it does not, the operation returns. If the requesting entity does receive the queried historical information, the requesting entity performs an operation that increases network efficiency (operation 408). For example, if the historical information indicates that the outstanding window size is small (implying that the flow is not congested), the requesting entity may increase its rate of transmission of interests for that namespace. Similarly, if the historical information indicates that the outstanding window size is large (implying congestion), the requesting entity may decrease its rate of interest transmission for that namespace. The requesting entity can perform other operations, such as setting or changing: a window size; a rate of transmission for original (e.g., first or initially transmitted) interests; and a rate of transmission for re-transmitted interests.

Responding Entity Responds to Query for Historical Information

Figure 5:
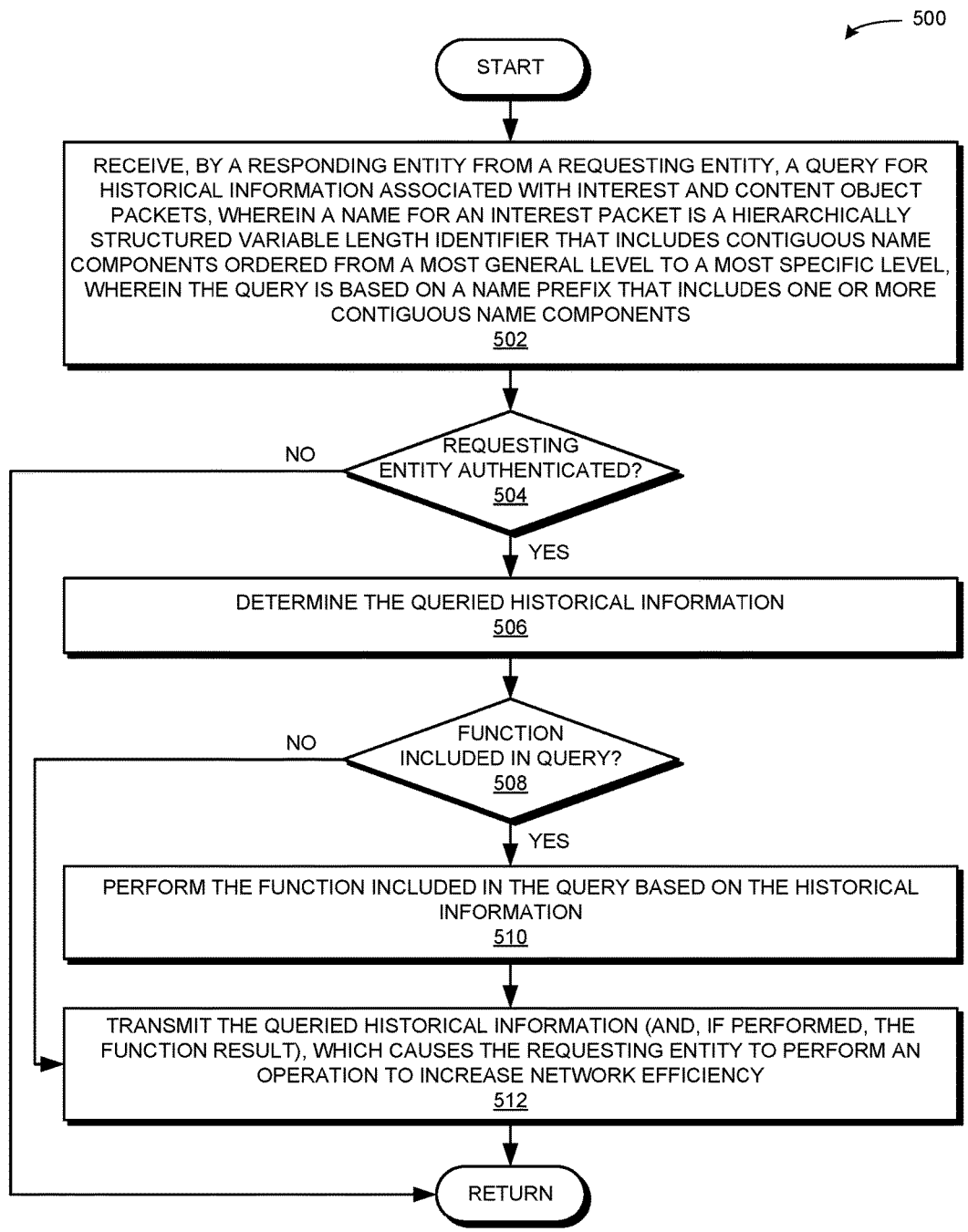
FIG. 5 presents a flow chart illustrating a method by a responding entity or a collector component for facilitating querying of historical network information in a content centric network, in accordance with an embodiment of the present invention.

FIG. 5 presents a flow chart 500 illustrating a method by a responding entity or a collector component for facilitating querying of historical network information in a content centric network, in accordance with an embodiment of the present invention. During operation, the responding entity receives from the requesting entity a query for historical information associated with interest and content object packets (operation 502). The responding entity can be the collector component, and the requesting entity can be a stack, a stack component, or an application in a CCN end-host device. A name for an interest packet is a hierarchically structured variable length identifier that includes contiguous name components ordered from a most general level to a most specific level, and the query is based on a name prefix that includes one or more contiguous name components. The query can be in the form of an interest message or a control message, as described above in relation to FIGS. 3A-3E. If the query is in the form of an interest message, the query can include a user identifier and authentication information (e.g., a signature or digital certificate) of the requesting entity. The collector component determines whether the requesting entity is authenticated based on the information included in the query (decision 504). Note that if the query is in the form of a control message and is transmitted by an application or a stack component associated with the same stack that the collector component either resides in or is associated with, the collector component can authenticate the query by determining that the requesting entity is a component or entity associated with the same local stack.

If the requesting entity is not successfully authenticated, the operation returns. If the requesting entity is successfully authenticated, the collector component determines the queried historical information (operation 506). The collector component can obtain the queried historical information from a local storage cache or another accessible storage medium. The collector component determines whether a function is included in the query (decision 508). If a function is not included in the query, the collector component transmits the queried historical information to the requesting entity, which causes the requesting entity to perform an operation that increases network efficiency (operation 512).

If a function is included in the query, the collector component performs the function included in the query based on the historical information (operation 510). For example, the function can be for an average RTT or an estimate of the transmission window size for a given namespace. The function can also be a user-defined function. These examples are described above in the section entitled "Exemplary Historical Information." Upon performing the function, the collector component transmits the result of the function performed on the queried historical information to the requesting entity, which causes the requesting entity to perform an operation to increase network efficiency (operation 512). Depending on the identity and authority of the requesting entity, the collector may also sanitize the requested historical information before transmitting it back to the requesting entity.

Exemplary Computer System

Figure 6:
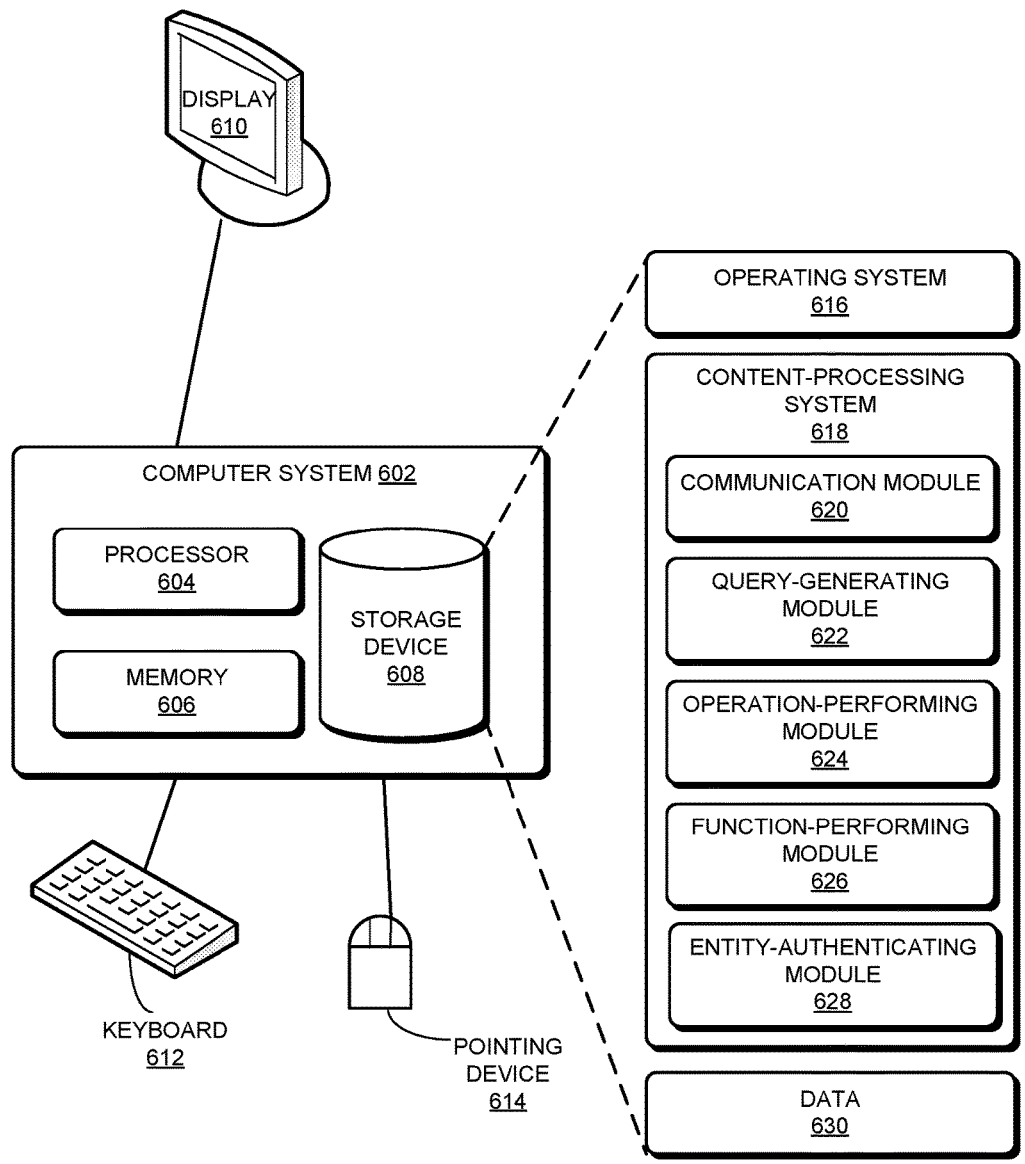
FIG. 6 illustrates an exemplary computer system that facilitates querying of historical network information in a content centric network, in accordance with an embodiment of the present invention.

FIG. 6 illustrates an exemplary computer system 602 that facilitates querying of historical network information in a content centric network, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 630.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network, such as a content centric network (communication module 620). A data packet can include an interest packet or a content object packet with a name that is an HSVLI. Further, content-processing system 618 can include instructions for generating a query for historical information associated with interest and corresponding content object packets (query-generating module 622). Content-processing system 618 can include instructions for transmitting the query to a responding entity (communication module 620), and, in response to receiving the historical information from the responding entity (communication module 620), performing an operation that increases network efficiency based on the historical information (operation-performing module 624). Content-processing system 618 can further include instructions for setting or changing a window size, setting or changing a rate of transmission for re-transmitted interests, setting or changing a rate of transmission for original interests, wherein an original interest is not a re-transmitted interest, and performing an operation related to increasing the efficiency of the network (operation-performing module 624).

Content-processing system 618 can additionally include instructions for receiving a query from a requesting entity for historical information associated with interest and corresponding content object packets (communication module 620). Content-processing system 618 can include instructions for, in response to authenticating the requesting entity (entity-authenticating module 628), transmitting the queried historical information (communication module 620). Content-processing system 618 can include instructions for performing a function on the historical information, including computing an estimate of an average round trip time for an interest and a corresponding content object packet based on the name prefix, computing an estimate of a size of a transmission window for the name prefix, and performing a function defined by the system of a user of the system (function-performing module 626).

Data 630 can include any data that is required as input or that is generated as output by the methods and/or processes described in this disclosure. Specifically, data 630 can store at least: a name; a name that is an HSVLI; one or more name components; a name prefix; a namespace; a packet that corresponds to an interest or a content object; a transport framework; a protocol or transport stack; one or more components of a transport or protocol stack; a collector component; a portal instance associated with a transport or protocol stack; historical information (as described above in the section entitled "Exemplary Historical Information"); a round trip time; a predetermined amount of time; a request or query for historical information; a control message; a routable name prefix; a user identifier; authentication information; a type for a query; a string for a query; one or more query parameters; a function for a query; a result of the function for the query; a randomly generated nonce; an identifier for a local forwarder; a window size; a rate of transmission for re-transmitted interests; and a rate of transmission for original interests.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer system for facilitating querying of historical network information, the system comprising:
a processor; and
a storage device storing instructions that when executed by the processor cause the processor to execute a method performed by a requesting entity of the computer system, the method comprising:
generating a query for historical information associated with interest packets and corresponding content object packets, wherein a name or a name prefix for an interest packet is a hierarchically structured variable length identifier (HSVLI) that includes contiguous name components ordered from a most general level to a most specific level,
wherein the generated query includes contiguous name components comprising a routable name prefix which includes one or more contiguous name components beginning from the most general level, a type for the query, and a random nonce;
transmitting the query to a responding entity; and
in response to receiving the historical information from the responding entity, performing an operation that increases network efficiency based on the historical information, thereby facilitating a protocol for querying the historical information to increase network efficiency,
wherein the operation is one or more of: setting or changing a transmission window size, setting or changing a rate of transmission for re-transmitted interest packets, and setting or changing a rate of transmission for original interest packets, wherein an original interest packet is not a re-transmitted interest packet.

2. The computer system of claim 1, wherein the query further includes one or more of:
one or more parameters for the query;
a function for the query; and
a payload data.

3. The computer system of claim 1, wherein when the requesting entity and the responding entity are not associated with a same transport stack, the query is an interest packet that further includes:
a user identifier of the requesting entity; and
authentication information of the requesting entity.

4. The computer system of claim 1, wherein the requesting entity is a component of a stack of communication modules, wherein the responding entity is a local forwarder that services the stack, and wherein the query is a control message that further includes:
an identifier for the local forwarder; and
a component which is responsible for collecting and storing the historical information, wherein the component resides in the local forwarder.

5. The computer system of claim 1, wherein the query further includes a command to perform a function on the historical information, wherein the function includes one or more of:
computing an estimate of an average round trip time for an interest and a corresponding content object based on the name prefix, wherein a round trip time begins when an interest packet is transmitted and ends when a corresponding content object packet is received, or begins when an interest packet is received and ends when a corresponding content object packet is transmitted, wherein the estimate is based on a plurality of average round trip times for a corresponding plurality of related namespaces that share at least one name prefix; and
computing an estimate of a size of a transmission window based on a number of outstanding interest packets for the name prefix for a predetermined period of time,
wherein performing a function is based on one or more interests as input, wherein an output for the function is a variable which can be stored by the system, and wherein the function is defined by the system or a user of the system.

6. The computer system of claim 1, wherein the requesting entity is one of:
an application associated with a first stack, wherein the responding entity resides in or is associated with the first stack;
an application associated with a second stack that is different from the first stack;
a stack component of the first stack, wherein the stack component is different from the responding entity;
a stack component of the second stack; and
any other element or node in the network.

7. The computer system of claim 1, wherein the responding entity resides in one of:
an application;
a single stack of a transport framework;
a shared stack of the transport framework;
a single forwarder;
a shared forwarder; and
any node in a network.

8. The computer system of claim 1, wherein the historical information associated with the packets is one or more of:
a round trip time that begins when an outgoing interest packet is transmitted and ends when a corresponding incoming content object packet is received;
a number of outgoing interest packets for which a corresponding incoming content object packet has not been received;

a number of outgoing interest packets for which a corresponding incoming content object packet is received based on a predetermined amount of time or the round trip time;

a number of bytes correctly retrieved based on the predetermined amount of time or the round trip time;

a number of outgoing interest packets that time out based on the predetermined amount of time or the round trip time;

a number of outgoing interest packets which are retransmitted based on the predetermined amount of time or the round trip time;

a number of re-transmitted outgoing interest packets that time out based on the predetermined amount of time or the round trip time;

a number of interest return messages received based on the predetermined amount of time or the round trip time, wherein an interest return message is received in response to an outgoing interest packet and is identified based on a code indicated in the message;

a number of outgoing interest packets aggregated based on the predetermined amount of time or the round trip time;

a number of active upstream paths identified for a given time;

a strategy for forwarding packets;

a first number of transmitted original interest packets, wherein an original interest packet is not a re-transmitted interest packet, and wherein the first number of original interest packets include names that share one or more name prefixes;

a second number of transmitted original interest packets, wherein the second number of original interest packets include names that do not share any name prefixes;

a first number of active entries in a forwarding information base, wherein the first number of entries include names that share one or more name prefixes; and a second number of active entries in a forwarding information base, wherein the second number of entries include names that do not share any name prefixes.

9. The computer system of claim 1, wherein the historical information associated with the packets is one or more of:

a round trip time that begins when an incoming interest packet is received and ends when a corresponding incoming content object packet is transmitted;

a number of incoming interest packets for which a corresponding outgoing content object packet has not been transmitted;

a number of incoming interest packets for which a corresponding outgoing content object packet is transmitted based on a predetermined amount of time or the round trip time;

a number of bytes correctly retrieved based on the predetermined amount of time or the round trip time;

a number of incoming interest packets that time out based on the predetermined amount of time or the round trip time;

a number of re-transmitted incoming interest packets based on the predetermined amount of time or the round trip time;

a number of re-transmitted incoming interest packets that time out based on the predetermined amount of time or the round trip time;

a number of interest return messages transmitted based on the predetermined amount of time or the round trip time, wherein an interest return message is transmitted in response to an incoming interest packet and is identified based on a code indicated in the message; and a number of incoming interest packets aggregated based on a predetermined amount of time or a round trip time.

10. A computer system for facilitating querying of historical network information, the system comprising:

a processor; and a storage device storing instructions that when executed by the processor cause the processor to execute a method performed by a responding entity of the computer system, the method comprising:

receiving a query from a requesting entity for historical information associated with interest packets and corresponding content object packets, wherein a name or a name prefix for an interest packet is a hierarchically structured variable length identifier (HSVLI) that includes contiguous name components ordered from a most general level to a most specific level, wherein the generated query includes contiguous name components comprising a routable name prefix, a type for the query, and a random nonce;

in response to authenticating the requesting entity, transmitting the queried historical information, which causes the requesting entity to perform an operation to increase network efficiency based on the historical information, thereby facilitating a protocol for querying the historical information to increase network efficiency, wherein the operation is one or more of: setting or changing a transmission window size, setting or changing a rate of transmission for re-transmitted interest packets, and setting or changing a rate of transmission for original interest packets, wherein an original interest packet is not a re-transmitted interest packet.

11. The computer system of claim 10, wherein the query further includes one or more of:

one or more parameters for the query;

a function for the query; and a payload data.

12. The computer system of claim 10, wherein when the requesting entity and the responding entity are not associated with a same transport stack, the query is an interest packet that further includes:

a user identifier of the requesting entity; and authentication information of the requesting entity.

13. The computer system of claim 10, wherein the responding entity is a local forwarder that services a stack of communication modules, wherein the requesting entity is a component of the same stack of communication modules, and wherein the query is a control message that further includes:

an identifier for the local forwarder; and a component which is responsible for collecting and storing the historical information, wherein the component resides in the local forwarder.

14. The computer system of claim 10, wherein the query further includes a command to perform a function on the historical information, wherein the function includes one or more of:

computing an estimate of an average round trip time for an interest and a corresponding content object based on the name prefix, wherein a round trip time begins when an interest packet is transmitted and ends when a corresponding content object packet is received, or begins when an interest packet is received and ends when a corresponding content object packet is transmitted, wherein the estimate is based on a plurality of average round trip times for a corresponding plurality of related namespaces that share at least one name prefix; and computing an estimate of a size of a transmission window based on a number of outstanding interest packets for the name prefix for a predetermined period of time wherein performing a function is based on one or more interests as input, wherein an output for the function is a variable which can be stored by the system, and wherein the function is defined by the system or a user of the system.

15. The computer system of claim 10, wherein the requesting entity is one of:
   an application associated with a first stack, wherein the responding entity resides in or is associated with the first stack;
   an application associated with a second stack that is different from the first stack;
   a stack component of the first stack, wherein the stack component is different from the responding entity;
   a stack component of the second stack; and
   any other element or node in the network.

16. The computer system of claim 10, wherein the responding entity resides in one of:
   an application;
   a single stack of a transport framework;
   a shared stack of the transport framework;
   a single forwarder;
   a shared forwarder; and
   any node in a network.

17. The computer system of claim 1, wherein the historical information associated with the packets is one or more of:
   a round trip time that begins when an outgoing interest packet is transmitted and ends when a corresponding incoming content object packet is received;
   a number of outgoing interest packets for which a corresponding incoming content object packet has not been received;
   a number of outgoing interest packets for which a corresponding incoming content object packet is received based on a predetermined amount of time or the round trip time;
   a number of bytes correctly retrieved based on the predetermined amount of time or the round trip time;
   a number of outgoing interest packets that time out based on the predetermined amount of time or the round trip time;
   a number of outgoing interest packets which are retransmitted based on the predetermined amount of time or the round trip time;
   a number of re-transmitted outgoing interest packets that time out based on the predetermined amount of time or the round trip time;
   a number of interest return messages received based on the predetermined amount of time or the round trip time, wherein an interest return message is received in response to an outgoing interest packet and is identified based on a code indicated in the message;
   a number of outgoing interest packets aggregated based on the predetermined amount of time or the round trip time;
   a number of active upstream paths identified for a given time;
   a strategy for forwarding packets;
   a first number of transmitted original interest packets, wherein an original interest packet is not a re-transmitted interest packet, and wherein the first number of original interest packets include names that share one or more name prefixes;
   a second number of transmitted original interest packets, wherein the second number of original interest packets include names that do not share any name prefixes;
   a first number of active entries in a forwarding information base, wherein the first number of entries include names that share one or more name prefixes; and
   a second number of active entries in a forwarding information base, wherein the second number of entries include names that do not share any name prefixes.

18. The computer system of claim 1, wherein the historical information associated with the packets is one or more of:
   a round trip time that begins when an incoming interest packet is received and ends when a corresponding incoming content object packet is transmitted;
   a number of incoming interest packets for which a corresponding outgoing content object packet has not been transmitted;
   a number of incoming interest packets for which a corresponding outgoing content object packet is transmitted based on a predetermined amount of time or the round trip time;
   a number of bytes correctly retrieved based on the predetermined amount of time or the round trip time;
   a number of incoming interest packets that time out based on the predetermined amount of time or the round trip time;
   a number of re-transmitted incoming interest packets based on the predetermined amount of time or the round trip time;
   a number of re-transmitted incoming interest packets that time out based on the predetermined amount of time or the round trip time;
   a number of interest return messages transmitted based on the predetermined amount of time or the round trip time, wherein an interest return message is transmitted in response to an incoming interest packet and is identified based on a code indicated in the message; and
   a number of incoming interest packets aggregated based on a predetermined amount of time or a round trip time.

* * * * *